US009575373B2

(12) United States Patent
 Yi et al.

(10) Patent No.: US 9,575,373 B2
(45) Date of Patent: Feb. 21, 2017

(54) DISPLAY DEVICE WHEREIN WIDTHS OF A PLURALITY OF FIRST MICROCAVITIES DECREASE FROM A CENTER OF ONE OF THE PLURALITY OF ZONES TO AN EDGE OF ONE OF THE PLURALITY OF ZONES

(71) Applicant: Samsung Display Co., Ltd., Yongin, Gyeonggi-Do (KR)

(72) Inventors: Jung Hwan Yi, Seoul (KR); Hee-Keun Lee, Suwon-si (KR); Moon Jung Baek, Seoul (KR); Jong Suk Lee, Daegu (KR); Kyung Ho Jung, Seongnam-si (KR); Jung-Hyun Cho, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 195 days.

(21) Appl. No.: 14/229,024

(22) Filed: Mar. 28, 2014

(65) Prior Publication Data
 US 2015/0116619 A1  Apr. 30, 2015

(30) Foreign Application Priority Data

Oct. 24, 2013 (KR) ........................ 10-2013-0127342

(51) Int. Cl.
 *G02F 1/1341* (2006.01)
 *G02B 27/22* (2006.01)
 *G02F 1/1333* (2006.01)
(52) U.S. Cl.
 CPC ......... *G02F 1/1341* (2013.01); *G02B 27/2214* (2013.01); *G02F 1/133377* (2013.01)

(58) Field of Classification Search
 CPC ... G02B 27/22; G02F 1/1337; G02F 1/133377
 See application file for complete search history.

(56) References Cited

U.S. PATENT DOCUMENTS

| 8,358,399 | B2 | 1/2013 | Lee et al. | |
| 2011/0043715 | A1* | 2/2011 | Ohyama | G02B 27/2214 349/15 |

(Continued)

FOREIGN PATENT DOCUMENTS

| KR | 10-2011-0104701 A | 9/2011 |
| KR | 10-2012-0026880 A1 | 3/2012 |

OTHER PUBLICATIONS

Pochi Yeh, Optics of Liquid Crystal Display, Sep. 16, 1999, p. 122, Wiley, Hoboken, N.J. (http://books.google.com/books/about/Optics_of_liquid_crystal_displays.html?id=wxxTAAAAMAAJ).

*Primary Examiner* — Paul Lee
(74) *Attorney, Agent, or Firm* — Innovation Counsel LLP

(57) ABSTRACT

A display device may include a display panel configured to display an image. The display device may further include a first electrode overlapping the display panel and separated from the display panel. The display device may further include a second electrode overlapping the first electrode and separated from the display panel. The display device may further include a first liquid crystal layer disposed between the first electrode and a first portion of the second electrode. The display device may further include a third electrode electrically insulated from the first electrode, overlapping the second electrode, and separated from the display panel. The display device may further include a second liquid crystal layer disposed between the third electrode and a second portion of the second electrode.

18 Claims, 39 Drawing Sheets

(56) References Cited

U.S. PATENT DOCUMENTS

| | | | |
|---|---|---|---|
| 2011/0128489 A1* | 6/2011 | Cho | G02F 1/13439 349/137 |
| 2011/0199561 A1* | 8/2011 | Hasegawa | G02B 5/30 349/96 |
| 2011/0228181 A1* | 9/2011 | Jeong | G02B 5/1842 349/15 |
| 2012/0062448 A1* | 3/2012 | Kim | G02F 1/133377 345/55 |
| 2012/0206666 A1* | 8/2012 | Jeong | G02F 1/292 349/15 |
| 2013/0107174 A1 | 5/2013 | Yun et al. | |

* cited by examiner

DISPLAY DEVICE WHEREIN WIDTHS OF A PLURALITY OF FIRST MICROCAVITIES DECREASE FROM A CENTER OF ONE OF THE PLURALITY OF ZONES TO AN EDGE OF ONE OF THE PLURALITY OF ZONES

CROSS-REFERENCE TO RELATED APPLICATION

This application claims priority to and the benefit of Korean Patent Application No. 10-2013-0127342 filed in the Korean Intellectual Property Office on Oct. 24, 2013, the entire contents of which are incorporated herein by reference.

BACKGROUND (a) Technical Field

The present invention is related to a display device. More particularly, the present invention is related to a display device that may be used for displaying two-dimensional (2D) images and for forming three-dimensional (3D) images.

(b) Description of the Related Art

A display device may be used for forming a 3D stereoscopic image based on binocular disparity. The display device may display an image for a left eye and an image for a right eye, and the two images may be respectively seen by the left eye and the right eye of a viewer. As a result, the viewer may perceive a 3D image.

The display device may include a first panel used for displaying 2D images and may include a second panel used for forming 3D images. The display device may further include a third panel configured to maintain a distance between the first panel and the second panel. One or more of the panels may undesirably add thickness and weight to the display device.

The above information disclosed in this Background section is for enhancement of understanding of the background of the invention. The Background section may contain information that does not form the prior art that is already known in this country to a person of ordinary skill in the art.

SUMMARY

Embodiments of the present invention may be related to a display device for enabling a viewer to perceive 2D images and to perceive 3D images. The display device may have a satisfactorily small thickness and/or a satisfactorily light weight. The display device may be associated with a simplified manufacturing process and/or low manufacturing cost.

An embodiment of the invention may be related to a display device that may include a display panel configured to display an image. The display device may further include a first electrode overlapping the display panel and separated from the display panel. The display device may further include a second electrode overlapping the first electrode and separated from the display panel. The display device may further include a first liquid crystal layer disposed between the first electrode and a first portion of the second electrode. The display device may further include a third electrode electrically insulated from the first electrode, overlapping the second electrode, and separated from the display panel. The display device may further include a second liquid crystal layer disposed between the third electrode and a second portion of the second electrode. The overlapping relations may be in a direction perpendicular to (e.g., a bottom/back surface of) a substrate of the display panel.

The first electrode may overlap a plurality of pixel electrodes of the display panel.

The first electrode may overlap a plurality of pixel rows of the display panel.

The first electrode may extend at an acute angle with respect to an extension direction of a pixel column of the display panel in an elevated view of the display device.

The first electrode, the first portion of the second electrode, the third electrode, and the second portion of the second electrode may be configured to form a portion of a first zone among zones of the display device.

The zones of the display device may be Fresnel zones. The first zone may be a Fresnel zone.

The first electrode may be positioned at a center of the first zone and may be wider than the third electrode in a direction parallel to a bottom/back surface of the display panel and/or parallel to a pixel row of the display panel.

The display device may include a fourth electrode electrically insulated from each of the first electrode and the third electrode, disposed between the first electrode and the third electrode, overlapping a third portion of the second electrode, narrower than the first electrode, and wider than the third electrode.

The third electrode may be positioned at an edge of the first zone and may be narrower than the first electrode.

The first liquid crystal layer may be positioned at a center of the first zone and may be thinner than the second liquid crystal layer in a direction perpendicular to a bottom/back surface of the display panel.

The display device may include a fourth electrode electrically insulated from each of the first electrode and the third electrode, disposed between the first electrode and the third electrode, and overlapping the second electrode. The display device may further include a third liquid crystal layer disposed between the fourth electrode and a third portion of the second electrode, thicker than the first liquid crystal layer, and thinner than the second liquid crystal layer.

The second liquid crystal layer may be positioned at an edge of the first zone and may be thicker than the first liquid crystal layer.

The first electrode may be configured to receive a first voltage when the third electrode receives a second voltage. The first electrode may be configured to receive the second voltage when the third electrode receives the first voltage. The second voltage may be different from the first voltage.

The display device may include a fourth electrode electrically insulated from each of the first electrode and the third electrode and overlapping a third portion of the second electrode. The third electrode may be disposed between the first electrode and the fourth electrode. The fourth electrode may be configured to receive the first voltage when the third electrode receives the second voltage. The fourth electrode may be configured to receive the second voltage when the third electrode receives the first voltage.

A third portion of the second electrode may be disposed between the first electrode and the third electrode.

At least one of a refractive index of the first electrode and a refractive index of the second electrode may be equal to a refractive index of the first liquid crystal layer.

The display device may include a roof layer separated from the display panel and configured to define a shape of the first liquid crystal layer and a shape of the second liquid crystal layer. A first portion of the roof layer may overlap the first liquid crystal layer. A second portion of the roof layer may be disposed between the first liquid crystal layer and the second liquid crystal layer and may be thicker than the first portion of the roof layer in a direction perpendicular to a back surface of the display panel.

The display panel may include a first display panel liquid crystal layer, a second display panel liquid crystal layer, and an encapsulation layer configured to seal the first display panel liquid crystal layer and the second display panel liquid crystal layer. A first portion of the encapsulation layer may be disposed between the first display panel liquid crystal layer and the second display panel liquid crystal layer. A second portion of the encapsulation layer may be disposed between and the first display panel liquid crystal layer and the first electrode.

The first electrode may be disposed between the encapsulation layer and the first liquid crystal layer.

The display device may include a polarizer disposed between the encapsulation layer and the first electrode.

The display device may include an adhesion member disposed between the encapsulation layer and the polarizer and directly contacting each of the encapsulation layer and the polarizer.

A display device according to an embodiment of the present invention may include the following elements: a display panel for displaying an image; and an image control panel for controlling the image displayed by the display panel to be perceived as a 2D image or a 3D image. The image control panel may include the following elements: a first substrate; a first electrode (or first-category electrode) formed on the first substrate; a second electrode (or second-category electrode) separated from the first electrode by a first microcavity (or first-category microcavity) and formed to enclose an upper portion and side portions of the first microcavity; a first roof layer formed on the second electrode; a first injection hole (or first-category injection hole) for providing access into the first microcavity; a first liquid crystal layer (or first-category liquid crystal layer) filling the first microcavity; and a first encapsulation layer formed on the first roof layer to cover the first injection hole and sealing the first microcavity.

The first electrode may extend from one end of the first substrate toward the other end of the first substrate in one direction.

The first substrate may include a plurality of zones, and a plurality of first electrodes (or first-category electrodes) may be respectively formed at each of the zones.

The first electrodes may be disposed in parallel in an oblique direction with respect to an edge of the first substrate.

Widths of first electrodes may (gradually) decrease from a center of a zone to an edge of the zone.

Heights of first microcavities (or first-category microcavities) may be substantially equal (or uniform).

Heights of first microcavities may (gradually) increase from a center of a zone to an edge of the zone.

The first injection hole may be formed at one or more edges of the first substrate.

The second electrode may have a plate plane shape.

The display device may include a first lower alignment layer (or first-category lower alignment layer) formed on the first electrode. The display device may further include a first upper alignment layer (or first-category upper alignment layer) formed under the second electrode.

The first lower alignment layer and the first upper alignment layer may be vertically aligned and form a pre-tilted configuration.

The display panel may include the following elements: a second substrate; a thin film transistor formed on the second substrate; a pixel electrode connected to the thin film transistor; a second roof layer separated from pixel electrodes by a plurality of second microcavities (or second-category microcavities) and formed to enclose upper portions and side portions of the second microcavities; a second injection hole (or second-category injection hole) for enabling access into a second microcavity; a second liquid crystal layer (or second-category liquid crystal layer) filling the second microcavity; and a second encapsulation layer formed on the second roof layer to cover the second injection hole thereby sealing the second microcavity.

The second substrate may include a plurality of pixel areas disposed according to a matrix arrangement. A plurality of pixel electrodes may be formed in the plurality of pixel areas.

The display device may include a common electrode formed under the second roof layer.

The display device may include a second lower alignment layer (or second-category lower alignment layer) formed on the pixel electrode. The display device may further include a second upper alignment layer (or second-category upper alignment layer) formed under the common electrode.

At least one of the first electrode and the second electrode may be made of a material having the same refractive index as that of the first liquid crystal layer.

The display device may include the following elements: a first polarizer positioned outside the display panel; a second polarizer positioned between the display panel and the image control panel; and a third polarizer positioned outside the image control panel.

The display device may include the following elements: a first adhesion member positioned between the display panel and the second polarizer; and a second adhesion member positioned between the image control panel and the second polarizer.

The image control panel may include a plurality of first electrodes having equal widths in a direction parallel to pixel rows of the display panel.

Among the plurality of first electrodes, odd-numbered first electrodes may be applied with a first signal when even-numbered first electrodes are applied with a second signal different from the first signal.

DETAILED DESCRIPTION OF THE EMBODIMENTS

Figure 1:
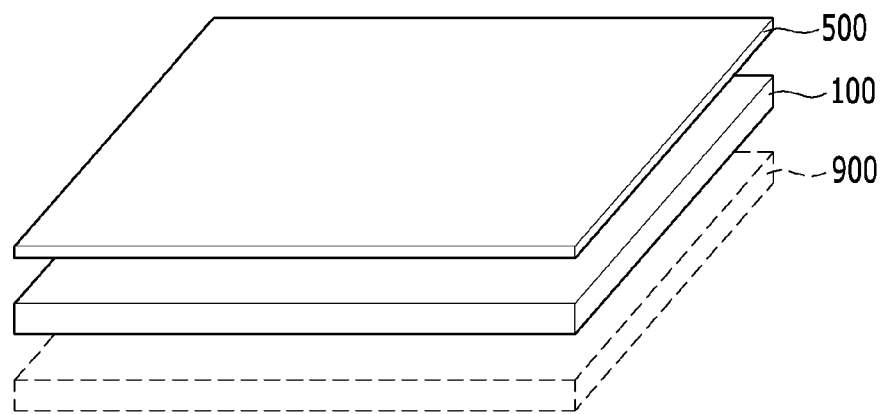
FIG. 1 is a perspective view illustrating a display device according to an embodiment of the present invention.

Embodiments of the present invention are further described with reference to the accompanying drawings. As those skilled in the art would realize, the described embodiments may be modified in various different ways, all without departing from the spirit or scope of the present invention.

In the drawings, the thickness of layers, films, panels, regions, etc., may be exaggerated for clarity. Like reference numerals may designate like elements in the specification. If an element, such as a layer, film, region, or substrate, is referred to as being "on" another element, it can be directly on the other element or an intervening element may also be present. If an element is referred to as being "directly on" another element, there are no intervening elements (except environmental elements such as air) present.

Although the terms "first", "second", etc. may be used herein to describe various elements, these elements, should not be limited by these terms. These terms may be used to distinguish one element from another element. Thus, a first element discussed below may be termed a second element without departing from the teachings of the present invention. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

FIG. 1 is a perspective view illustrating a display device according to an embodiment of the present invention.

The display device includes a display panel 100, an image control panel 500, and a light source unit 900. The display panel 100 is configured for displaying an image. The image control panel 500 is configured for controlling the image displayed by the display panel 100 to be perceived as a 2D image or a 3D image. The light source unit 900 is configured for supplying light to the display panel 100.

The display panel 100 may be a liquid crystal panel. The display panel 100 may be or may include one of various panels, such as one of a plasma display panel (PDP), an organic light emitting display (OLED) panel, etc. The display panel 100 may display 2D plane images.

The image control panel 500 may control an image displayed by the display panel 100 to be perceived as a 2D image or a 3D stereoscopic image by a user of the display device. If an image displayed by the display panel 100 is transmitted as it is, a 2D plane image is perceived. If an image displayed by the display panel 100 is divided into a left-eye image and a right-eye image to be respectively seen by a left eye and a right eye, a 3D stereoscopic image is perceived. The image control panel 500 may control a 2D image to be displayed as it is when a 2D plane image is wanted (or required); the image control panel 500 may control conversion of a 2D image into a left-eye image and a right-eye image when a 3D stereoscopic image is wanted (or required).

The light source unit 900 may be omitted or may be optional if the display panel 100 may display images using natural light and/or if the display panel 100 is a self-light-emitting device. The light source unit 900 may include a cold cathode fluorescent lamp (CCFL), an external electrode fluorescent lamp (EEFL), a flat fluorescent lamp (FFL), or a light emitting diode (LED).

Figure 2:
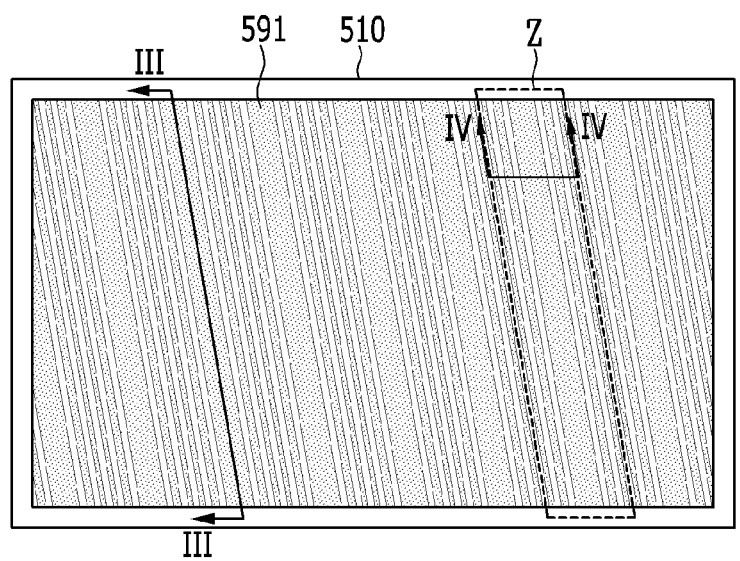
FIG. 2 is an elevated view (e.g., a top plan view) illustrating an image control panel of a display device according to an embodiment of the present invention.
Figure 3:
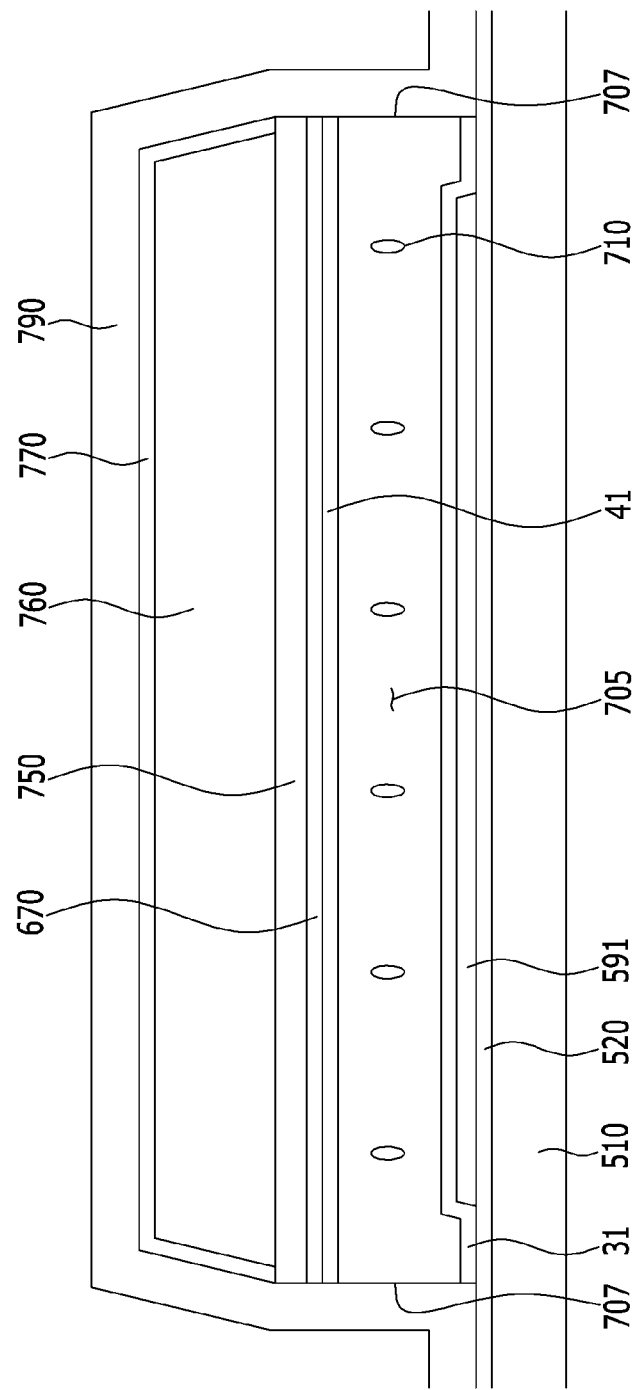
FIG. 3 is a cross-sectional view illustrating an image control panel of a display device according to an embodiment of the present invention taken along the line III-III indicated in FIG. 2.
Figure 4:
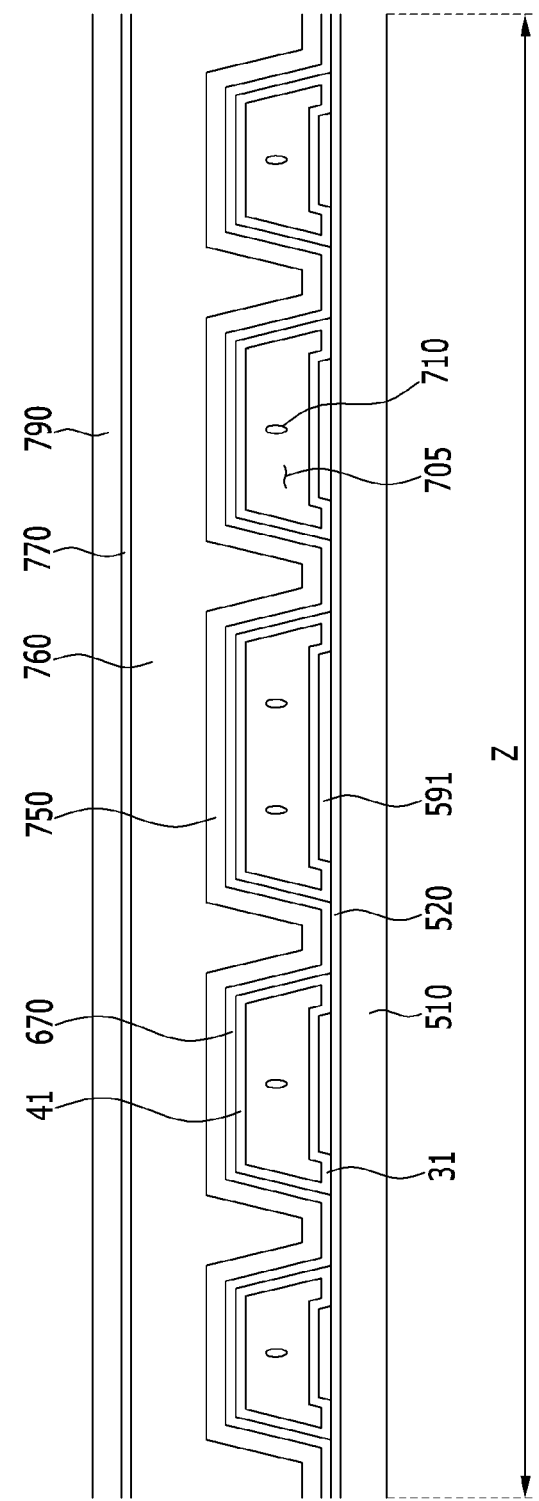
FIG. 4 is a cross-sectional view illustrating an image control panel of a display device according to an embodiment of the present invention taken along the line IV-IV indicated in FIG. 2.

FIG. 2 is a top plan view illustrating the image control panel 500 according to an embodiment of the present invention. FIG. 3 is a cross-sectional view taken along the line III-III indicated in FIG. 2. FIG. 4 is a cross-sectional view of a zone Z of the image control panel 500 taken along the line IV-IV indicated in FIG. 2. The image control panel 500 may include a plurality of zones Z. Each zone Z may have a parallelogram shape, and the zones Z may be substantially parallel to one another.

In the image control panel 500, a first insulating layer 520 is formed (and/or disposed) on a first substrate 510. The first substrate 510 may be made of glass or plastic. The first insulating layer 520 may be formed of an organic insulating material or an inorganic insulating material. In an embodiment, the first insulating layer 520 may be omitted.

A first electrode 591 (or first-category electrode 591) is formed (and/or disposed) on the first insulating layer 520. The first electrode 591 may be formed of a transparent conductive material, such as indium tin oxide (ITO) or indium zinc oxide (IZO).

The first electrode 591 extends in one direction from one end of the first substrate 510 to the other end of the first substrate 510. For example, as shown in FIG. 2, the first electrode 591 extends from an upper end of the first substrate 510 toward a lower end of the first substrate 510. A first plurality of first electrodes 591 (or first-category electrodes 591) may be disposed in a first zone Z, and a second plurality of first electrodes 591 may be disposed in a second zone Z immediately neighboring the first zone Z. A plurality of first electrodes 591 may be respectively disposed in each zone Z of zones Z. First electrodes 591 may be disposed in parallel. Each first electrode 591 may extend in an oblique direction with respect to edges of the first substrate 510. The first substrate 510 may have a quadrangle shape, and the first electrode 591 may extend at an acute angle (more than 0 degree and less than 90 degrees) with respect to one or more sides of the first substrate 510. The first electrodes 591 may not overlap in a direction perpendicular to a back surface of the first substrate 510, may be electrically insulated from one another, and may be separated from neighboring first electrodes 591 by a predetermined interval.

The width of the center first electrode 591 positioned at a center of a zone Z may be widest, the widths of intermediate first electrodes 591 positioned at two sides of the center first electrode 591 may be narrower than that of the center first electrode 591, and the widths of the edge first electrodes 591 positioned at edges of the zone Z may be narrowest. Widths of the first electrodes 591 in a zone Z may (gradually) decrease from the center of the zone Z to edges of the zone Z.

The first electrodes 591 may be applied with different voltages according to the positions of the first electrodes 591. For example, the voltage applied to the center first electrode 591 positioned at the center of one zone Z may be different from the voltage(s) applied to intermediate first electrodes 591 positioned at two sides of the center first electrode 591. The voltage(s) applied to the intermediate first electrodes 591 positioned at two sides of the center first electrode 591 may be different from the voltage(s) applied to the edge first electrodes 591 positioned at edges of the zone Z. In an embodiment, the voltages applied to the two intermediate first electrodes 591 positioned at two sides of the center first electrode 591 may have the same value. In an embodiment, the voltages applied to two edge first electrodes 591 positioned at edges of the zone Z may have the same value.

A second electrode 670 (or second-category electrode 670) may overlap a plurality of firs electrodes 591 and may be separated from each of the first electrodes 591 by the predetermined interval. A first microcavity 705 (or first-category microcavity 705) is formed between each first electrode 591 and the second electrode 670. The second electrode 670 may enclose an upper surface and a side surface of the first microcavity 705. A first microcavity 705 may have a bar shape and extend in the oblique extension direction of a first electrode 591.

In a zone Z, corresponding to the widths of corresponding first electrodes 591, the width of the center first microcavity 705 positioned at the center of the zone Z may be widest, the width(s) of intermediate first microcavities 705 positioned at two sides of the center first microcavity 705 may be narrower than the width of the center first microcavity 705, and the width(s) of the edge first microcavities 705 positioned at edges of the zone Z may be narrowest. That is, a plurality of first microcavities 705 may be positioned in each zone Z, and the widths of the first microcavities 705 may (gradually) decrease from the center of the zone Z to edges of the zone Z. The first microcavities 705 may have equal heights.

In an embodiment, five first electrodes 591 and five first microcavities 705 may be positioned in a zone Z. In an embodiment, the quantity of first electrodes 591 and/or the quantity of first microcavities 705 in a zone Z may be different from five.

The second electrode 670 may be formed of a transparent conductive material, such as indium tin oxide (ITO) and indium zinc oxide (IZO). The second electrode 670 may have a plate plane shape. The second electrode 670 may be applied with a constant voltage. In an embodiment, a portion of the second electrode 670 may be positioned between immediately neighboring first electrodes 591 and/or may directly contact the first insulating layer 520.

A first lower alignment layer 31 (or first-category lower alignment layer 31) is formed (and/or disposed) on the first electrode 591. A portion of the first lower alignment layer 31 may directly contact a portion of the first insulating layer 520 that is not covered by the first electrode 591.

A first upper alignment layer 41 (or first-category upper alignment layer 41) is formed under the second electrode 670 and overlaps the first lower alignment layer 31.

The first lower alignment layer 31 and the first upper alignment layer 41 may be vertical alignment layers and may be made of an alignment material that may include one or more of polyamic acid, polysiloxane, and polyimide. The first lower alignment layer 31 and the first upper alignment layer 41 may be connected at one or more sides (or edges) of the first microcavity 705. The first lower alignment layer 31 and the first upper alignment layer 41 may be photo-aligned to form a pre-tilted configuration.

A first liquid crystal layer (or first-category liquid crystal layer) that includes liquid crystal molecules 710 may be formed (and/or disposed) in the first microcavity 705 positioned between each first electrode 591 and the second electrode 670. The liquid crystal molecules 710 may have negative dielectric anisotropy and may be aligned (or oriented) in a direction perpendicular to a surface (e.g., bottom surface or top surface) of the first substrate 510 in absence of an electric field. That is, the initial alignment of the liquid crystal molecules 710 may be in a vertical direction with respect to the first substrate 510.

In an embodiment, the first lower alignment layer 31 and the first upper alignment layer 41 may be horizontal alignment layers, and the liquid crystal molecules 710 may be horizontally aligned (and/or oriented).

If no voltage is applied to the first electrode 591 and the second electrode 670 of the image control panel 500, an image displayed by the display panel 100 may be transmitted substantially as it is such that a 2D plane image is perceived by a viewer. In an embodiment, in order to prevent a distortion in transmitting the light emitted from the display panel 100 through the image control panel 500, at least one of the first electrode 591 and the second electrode 670 may be formed of a material that has the same refractive index as the liquid crystal molecules 710 of the first liquid crystal layer. One of the first electrode 591 and the second electrode 670 may be formed of the material that has the same refractive index as the liquid crystal molecules 710 of the first liquid crystal layer.

If a (predetermined) voltage is applied to at least one of the first electrode 591 and the second electrode 670, an electric field is applied to the liquid crystal molecules 710 of the first liquid crystal layer; therefore the image control panel 500 may be analogous to a Fresnel zone plate. A Fresnel zone plate may include radially (and/or concentrically) arranged Fresnel zones with intervals decreased from the center of the plate to the edge of the plate and may function as a lens. The image control panel 500 may function as a lens to change light paths such that an image emitted from the display panel 100 may be divided into a left-eye image and a right-eye image to be respectively seen by the left eye and the right eye of a viewer, such that the viewer may perceive a 3D stereoscopic image.

A second insulating layer 750 may be formed (and/or disposed) on the second electrode 670. The second insulating layer 750 may be formed of an inorganic insulating material, such as at least one of silicon nitride (SiNx) and silicon oxide (SiOx). In an embodiment, the second insulating layer 750 may be omitted.

A first roof layer 760 (or first-category roof layer 760) is formed (and/or disposed) on the second insulating layer 750. The first roof layer 760 may be formed of an organic material. The first microcavity 705 is formed under the first roof layer 760. The first roof layer 760 may be hardened through a hardening process, for maintaining the shape of the first microcavity 705. The first roof layer 760 may be separated from the first electrode 591, and the first microcavity 705 may be disposed between the first roof layer 760 and the first electrode 591.

The first roof layer 760 may have a plate plane shape. First-category portions of the first roof layer 760 may be separated from the first substrate 510 by at least first microcavities 705. Second-category portions of the first roof layer 760 may be adhered to the first substrate 510 (through the first insulating layer 520, the second electrode 670, and/or the second insulating layer 750) and may be disposed between immediate neighboring first microcavities 705. The second-category portions of the first roof layer 760 may be thicker than the first-category portions of the first roof layer 760.

A first microcavity 705 may be substantially enclosed by the second electrode 670 (and the first roof layer 760) but partially exposed by a first injection hole 707 (or first-category injection hole 707). In an embodiment, the upper side and two sides of a first microcavity 705 may be covered by the second electrode 670 and the first roof layer 760, and two other sides of the first microcavity 705 may be exposed by the first injection hole 707. An aligning agent and/or a liquid crystal material may be injected into the first microcavity 705 through the first injection hole 707.

First injection holes 707 may be formed at two ends (or edges) of the first substrate 510. For example, as can be appreciated from FIG. 2 and FIG. 3, first injection holes 707 may be formed (and/or disposed) at the upper end and the lower end of the first substrate 510. In an embodiment, first injection holes 707 may be formed at only one of the upper end and the lower end of the first substrate 510. In an embodiment, the first injection hole 707 may be formed (and/or disposed) at a center portion (e.g., along a center line) of the first substrate 510.

A third insulating layer 770 may be formed (and/or disposed) on the first roof layer 760. The third insulating layer 770 may be formed of an inorganic insulating material, such as at least one of silicon nitride (SiNx) and silicon oxide (SiOx). The third insulating layer 770 may cover the upper surface and side surfaces of the first roof layer 760. The third insulating layer 770 may protect the first roof layer 760, which may be made of an organic material. In an embodiment, the third insulating layer 770 may be omitted.

A first encapsulation layer 790 is formed (and/or disposed) on the third insulating layer 770. The first encapsulation layer 790 may cover the first injection holes 707 and may seal the first microcavities 705 such that the liquid crystal molecules 710 of the first liquid crystal layers may be substantially secured inside the first microcavities 705 without substantial leakage. The first encapsulation layer 790 may directly contact the liquid crystal molecules 710 and may be made of a material that does not substantially (chemically) react with the liquid crystal molecules 710. For example, the first encapsulation layer 790 may be made of PARYLENE.

The first encapsulation layer 790 may have a multilayer structure, such as a dual-layer structure or a triple-layer structure. The dual-layer structure includes two layers made of different materials. The triple-layer structure may include three layers, wherein materials of two adjacent layers are different from each other. For example, the first encapsulation layer 790 may include a layer made of an organic insulating material and may include a layer made of an inorganic insulating material.

Figure 5:
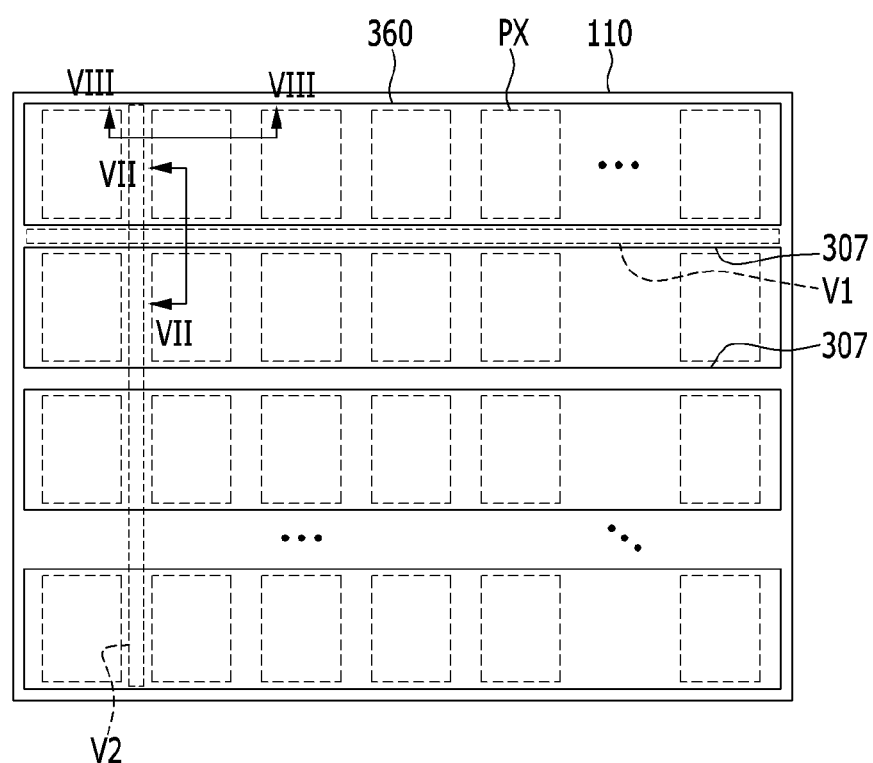
FIG. 5 is a top plan view illustrating a display panel of a display device according to an embodiment of the present invention.
Figure 6:
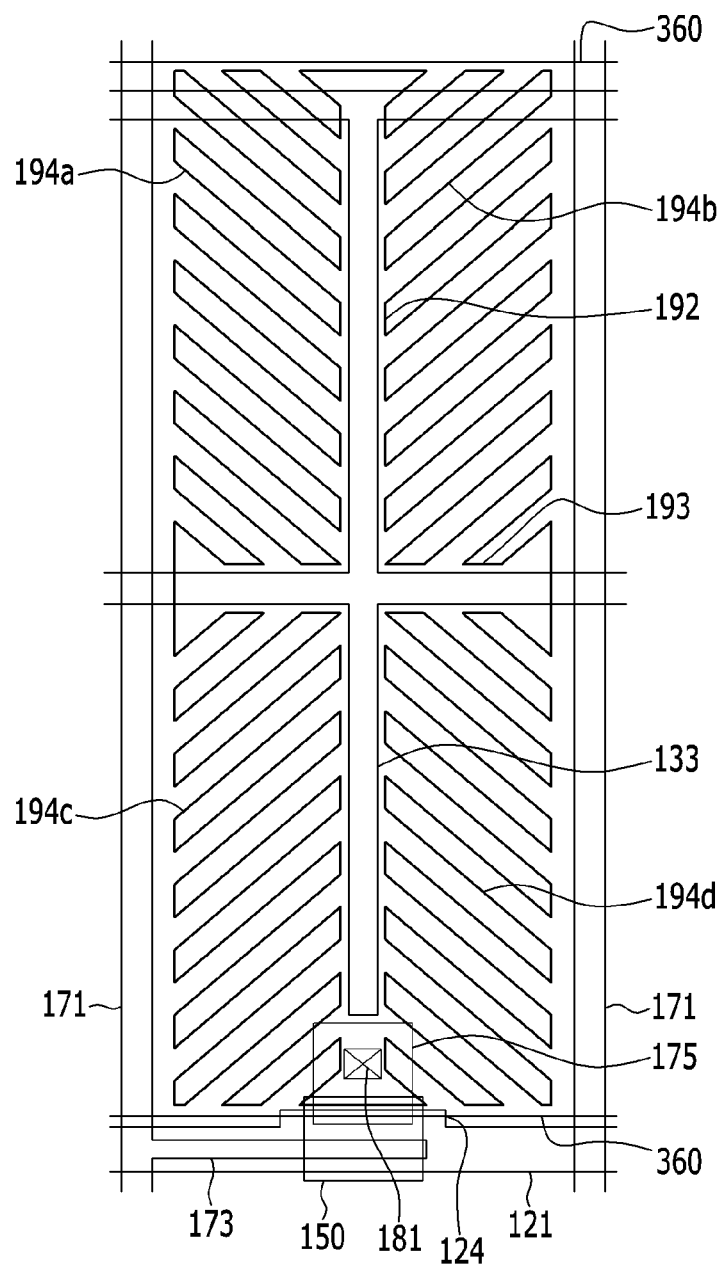
FIG. 6 is a top plan view illustrating a pixel of a display panel of a display device according to an embodiment of the present invention.
Figure 7:
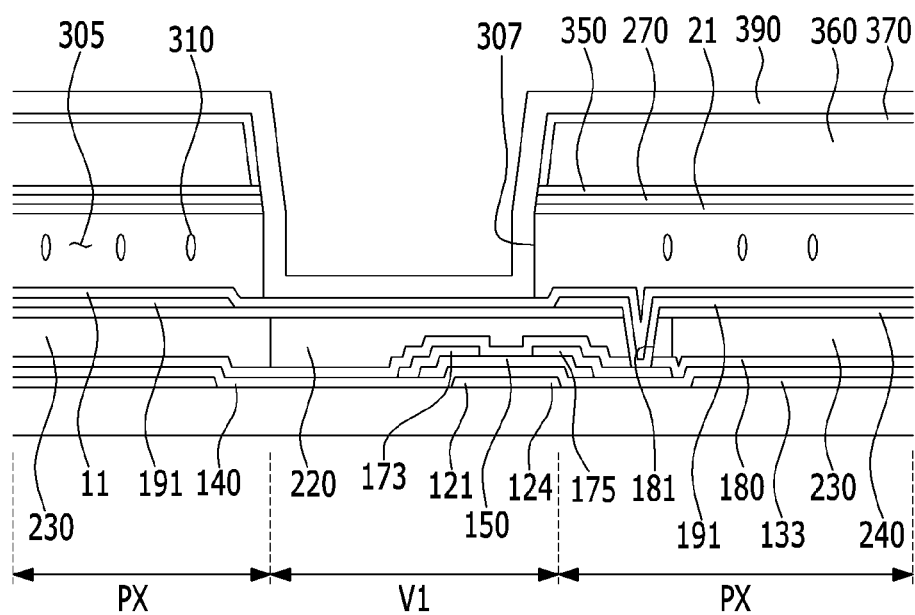
FIG. 7 is a cross-sectional view illustrating a display panel of a display device according to an embodiment of the present invention taken along the line VII-VII indicated in FIG. 5.
Figure 8:
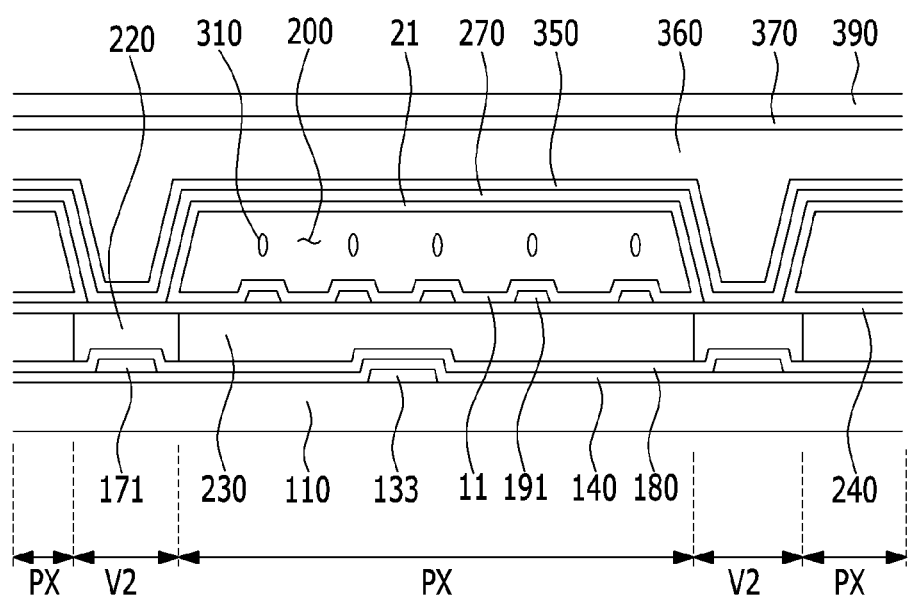
FIG. 8 is a cross-sectional view illustrating a display panel of a display device according to an embodiment of the present invention taken along the line VIII-VIII indicated in FIG. 5.

FIG. 5 is a schematic top plan view illustrating the display panel 100 according to an embodiment of the present invention. FIG. 6 is a top plan view illustrating a pixel of the display panel 100 according to an embodiment of the present invention. FIG. 7 is a cross-sectional view taken along the line VII-VII indicated in FIG. 5. FIG. 8 is a cross-sectional view taken along the line VIII-VIII indicated in FIG. 5.

The display panel 100 may include a second substrate 110. The second substrate may be made of glass or plastic.

The display panel 100 (and the second substrate 110) may include a plurality of pixel areas PX. The pixel areas PX may form a matrix that includes a plurality of pixel rows and a plurality of pixel columns. A first valley V1 (or first-category valley V1) is positioned between two immediately neighboring pixel rows. A second valley V2 (or second-category valley V2) is positioned between two immediately pixel columns.

The pixel areas PX may have one or more of other arrangements and/or shapes.

Gate lines 121 may extend in one direction and may overlap the second substrate 110. Data lines 171 may extend in another direction and may overlap the second substrate 110. The gate lines 121 may be formed (and/or disposed) in first valleys V1, and the data lines 171 may be formed (and/or disposed) in second valleys V2. The gate lines 121 and the data lines 171 may cross. The pixel areas PX may be defined by the gate lines 121 and the data lines 171.

The gate lines 121 may substantially extend in a transverse direction and may transfer gate signals. A gate electrode 124 may protrude from each gate line 121. A gate signal may be applied to a gate electrode 124 through a gate line 121.

A storage electrode 133 may be formed (and/or disposed) in a pixel area PX and may be electrically insulated from the gate line 121 and the gate electrode 124. As illustrated in FIG. 6, two portions of a storage electrode 133 may extend parallel to a gate line 121 and a data line 171, respectively. In an embodiment, a storage electrode 133 may extend parallel to a gate line 121 without including a portion parallel to a data line 171. Storage electrodes 133 formed (and/or disposed) in adjacent pixel areas PX may be electrically connected to each other. A predetermined voltage, such as common voltage, may be applied to the storage electrodes 133.

A gate insulating layer 140 is formed (and/or disposed) on the gate lines 121, the gate electrodes 124, and the storage electrodes 133. The gate insulating layer 140 may be made of an inorganic insulating material, such as at least one of silicon nitride (SiNx) and silicon oxide (SiOx). The gate insulating layer 140 may have a single-layer or multilayer structure.

A semiconductor 150 is formed (and/or disposed) on the gate insulating layer 140. The semiconductor 150 may overlap a gate electrode 124. The semiconductor 150 may overlap a source electrode 173, which may extend from a data line 171. The semiconductor 150 may be made of at least one of amorphous silicon, polycrystalline silicon, a metal oxide, etc.

A source electrode 173 that protrudes from a data line 171 and a drain electrode 175 that is spaced from the source electrode 173 are formed (and/or disposed) on the semiconductor 150.

The data lines 171 may substantially extend in a longitudinal direction and may transfer data signals. A data signal transferred to the data line 171 is applied to a source electrode 173.

A gate electrode 124, a semiconductor 150, a source electrode 173, and a drain electrode 175 may form a thin film transistor. When the thin film transistor is turned on, the data signal applied to the source electrode 173 is transferred to the drain electrode 175.

A passivation layer 180 is formed (and/or disposed) on a portion of the semiconductor 150 that is exposed by the data line 171, the source electrode 173, and the drain electrode 175. The passivation layer 180 covers the electrodes 173 and 175. The passivation layer 180 may be made of an organic insulating material or an inorganic insulating material. The passivation layer 180 may have a single-layer or a multilayer structure.

A color filter 230 is formed (and/or disposed) in each pixel area PX on the passivation layer 180. Each color filter 230 may display one of primary colors, such as one of red, green, and blue. In an embodiment, each color filter 230 may display one of cyan, magenta, yellow, and white-based colors.

A light blocking member 220 is formed (and/or disposed) between immediately neighboring color filters 230. The light blocking member 220 is formed (and/or disposed) at a boundary of the pixel area and/or the thin film transistor to prevent light leakage. The light blocking member 220 may be formed (and/or disposed) in the first valley V1 and the second valley V2.

A fourth insulating layer 240 may be formed (and/or disposed) on the color filters 230 and the light blocking member 220. The fourth insulating layer 240 may be made of an inorganic insulating material, such as at least one of silicon nitride (SiNx) and silicon oxide (SiOx). The fourth insulating layer 240 may protect the color filters 230 (which may be made of an organic material) and the light blocking member 220. In an embodiment, the fourth insulating layer 240 may also be omitted.

A contact hole 181 is formed through the fourth insulating layer 240, the light blocking member 220, and the passivation layer 180 so that a part of the drain electrode 175 is exposed. The contact hole 181 may be formed through a color filter 230 instead of the light blocking member 220.

A pixel electrode 191 is formed (and/or disposed) on the fourth insulating layer 240 and is electrically connected to the drain electrode 175 through the contact hole 181.

A pixel electrode 191 is formed in each pixel area PX and may receive a data signal from the drain electrode 175 when the associated thin film transistor is turned on. The pixel electrode 191 may be made of a transparent metal material, such as at least one of indium tin oxide (ITO) and indium zinc oxide (IZO).

The pixel electrode 191 includes a transverse stem 193, a longitudinal stem 192 substantially perpendicular to the transverse stem 193, and a plurality of minute branches 194a, 194b, 194c, and 194d.

The transverse stem 193 may extend parallel to the gate lines 121, and the longitudinal stem 192 may extend parallel to the data lines 171. The transverse stem 193 may be formed (and/or positioned) substantially in the middle between two immediately adjacent gate lines 121, and the longitudinal stem 192 may be formed (and/or positioned) substantially in the middle between two immediately adjacent data lines 171.

A pixel area PX may be divided into a first subpixel area, a second subpixel area, a third subpixel area, and a fourth subpixel area by the transverse stem 193 and the longitudinal stem 192. The first subpixel area is positioned at the left of the transverse stem 193 and the upper side of the longitudinal stem 192. The second subpixel area is positioned at the right of the transverse stem 193 and the upper side of the longitudinal stem 192. The third subpixel area is positioned at the left of the transverse stem 193 and the lower side of the longitudinal stem 192. The fourth subpixel area is positioned at the right of the transverse stem 193 and the lower side of the longitudinal stem 192.

The first minute branch 194a is formed (and/or disposed) in the first subpixel area. The second minute branch 194b is formed (and/or disposed) in the second subpixel area. The third minute branch 194c is formed (and/or disposed) in the third subpixel area. The fourth minute branch 194d is formed (and/or disposed) in the fourth subpixel area.

The first minute branch 194a extends obliquely in an upper left direction from the transverse stem 193 or the longitudinal stem 192. The second minute branch 194b extends obliquely in an upper right direction from the transverse stem 193 or the longitudinal stem 192. The third minute branch 194c extends obliquely in a lower left direction from the transverse stem 193 or the longitudinal stem 192. The fourth minute branch 194d extends obliquely in a lower right direction from the transverse stem 193 or the longitudinal stem 192.

Each of the minute branches 194a to 194d may extend at an angle of substantially 45 degrees or 135 degrees with respect to the gate line 121 or the transverse stem 193. Two of the minute branches 194a to 194d of adjacent subpixel areas may be perpendicular to each other.

The shape of the pixel electrode 191 may be different from the shape illustrated in FIG. 6. A pixel area PX may include more or less than four subpixel areas and/or may not be divided into subpixel areas.

A common electrode 270 overlaps the pixel electrode 191 and is spaced from the pixel electrode 191 by a predetermined distance. A second microcavity 305 (or second-category microcavity 305) is formed between the pixel electrode 191 and the common electrode 270. The second microcavity 305 may be substantially enclosed by the pixel electrode 191 and the common electrode 270. The width and area of the second microcavity 305 may be configured according to resolution of the display device. In an embodiment, the common electrode 270 may be positioned between the pixel electrode 191 and the second microcavity.

The common electrode 270 may be made of a transparent metal material, such as at least one of indium-tin oxide (ITO), indium-zinc oxide (IZO), etc. A predetermined voltage may be applied to the common electrode 270, and an electric field may be formed between the pixel electrode 191 and the common electrode 270.

A second lower alignment layer 11 (or second-category lower alignment layer 11) is formed (and/or disposed) on the pixel electrode 191. The second lower alignment layer 11 may directly a portion of the fourth insulating layer 240 that is not covered by the pixel electrode 191.

A second upper alignment layer 21 (or second-category upper alignment layer 21) is formed (and/or disposed) under the common electrode 270 and overlaps the second lower alignment layer 11.

The second lower alignment layer 11 and the second upper alignment layer 21 may be vertical alignment layers and may be made of an alignment material, such as at least one of polyamic acid, polysiloxane, and polyimide. The second lower alignment layer 11 and the second upper alignment layer 21 may connect at one or more sides of the second microcavity 305. The second lower alignment layer 11 and the second upper alignment layer 21 may be photo-aligned to form a pre-tilted configuration.

A second liquid crystal layer (or second-category liquid crystal layer) that includes liquid crystal molecules 310 is formed (and/or disposed) in the second microcavity 305. The liquid crystal molecules 310 may have negative dielectric anisotropy and may be aligned (or oriented) perpendicular to a surface (e.g., bottom surface or top surface) of the second substrate 110 in absence of an electric field. That is, the initial alignment of the liquid crystal molecules may be in a vertical direction with respect to the second substrate 110.

The pixel electrode 191, to which a data voltage is applied, may generate an electric field together with the common electrode 270 to control the orientation of liquid crystal molecules 310, thereby controlling luminance of light passing through the liquid crystal layer.

A fifth insulating layer 350 may be formed (and/or disposed) on the common electrode 270. The fifth insulating layer 350 may be made of an inorganic insulating material, such as at least one of a silicon nitride (SiNx), a silicon oxide (SiOx), etc. In an embodiment, the fifth insulating layer 350 may also be omitted.

A second roof layer 360 (or second-category roof layer 360) is formed (and/or disposed) on the fifth insulating layer 350. The second roof layer 360 may be made of an organic material. The second microcavity 305 is formed under the second roof layer 360. The second roof layer 360 may be hardened through a hardening process, for maintaining the shape of the second microcavity 305. The second microcavity 305 may be disposed between the second roof layer 360 and the pixel electrode 191.

A second roof layer 360 is formed (and/or disposed) in pixel areas PX along a pixel row and in a second valley V2 without being formed in a first valley V1. In the second valley V2, no second microcavity 305 is substantially present, and the second roof layer 360 may adhere to the second substrate 110 (through the fifth insulating layer 350, etc.). Accordingly, a first-category portion of the second roof layer 360 positioned at a second valley V2 may be thicker than a second-category portion of the second roof layer 360 (overlapping a second microcavity 305 and) positioned at a pixel area PX.

A second microcavity 305 may be substantially enclosed by the common electrode 270 (and the second roof layer 360) but partially exposed by a second injection hole 307 (or second-category injection hole 307). The upper side and two sides of the second microcavity 305 may be covered by the common electrode 270 and the second roof layer 360, and two other sides of the second microcavity 305 is exposed by the second injection hole 307. Since the second microcavity 305 may be exposed by the second injection hole 307. An aligning agent and/or a liquid crystal material may be injected into the second microcavity 305 through the second injection hole 307.

As can be appreciated from FIG. 5 and FIG. 7, second injection holes 307 may be formed at edges of first valleys V1.

A sixth insulating layer 370 may be formed (and/or disposed) on the second roof layer 360. The sixth insulating layer 370 may be formed of an inorganic insulating material, such as at least one of silicon nitride (SiNx) and silicon oxide (SiOx). The sixth insulating layer 370 may cover the upper surface and side surfaces of the second roof layer 360. The six insulating layer 370 may protect the second roof layer 360, which may be made of an organic material. In an embodiment, the six insulating layer 370 may be omitted.

A second encapsulation layer 390 may be formed (and/or disposed) on the sixth insulating layer 370. The second encapsulation layer 390 may cover the second injection hole 307 and may seal the second microcavity 305 such that the liquid crystal molecules 310 of the second liquid crystal layers may be substantially secured inside the second microcavity 305 without substantial leakage. The second encapsulation layer 390 may directly contact the liquid crystal molecules 310 and may be made of a material that does not substantially (chemically) react with the liquid crystal molecules 310. For example, the second encapsulation layer 390 may be made of PARYLENE.

The second encapsulation layer 390 may have a multi-layer structure, such as a dual-layer or -triple-layer structure. The dual-layer structure includes two layers made of different materials. The triple-layer structure includes three layers, wherein materials of two adjacent layers are different from each other. For example, the second encapsulation layer 390 may include a layer made of an organic insulating material and may include a layer made of an inorganic insulating material.

FIG. 9 to FIG. 20 are process cross-sectional views illustrating a manufacturing process of the image control panel 500 according to an embodiment of the present invention. FIG. 9, FIG. 11, FIG. 13, FIG. 15, FIG. 17, and FIG. 19 are cross-sectional views taken along a same line. FIG. 10, FIG. 12, FIG. 14, FIG. 16, FIG. 18, and FIG. 20 are cross-sectional views taken along a same line.

Figure 9:
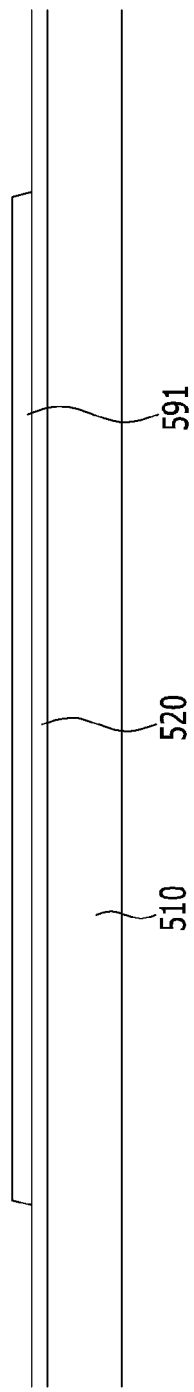
FIG. 9 to FIG. 20 are process cross-sectional views illustrating a manufacturing process of an image control panel of a display device according to an embodiment of the present invention.
Figure 10:
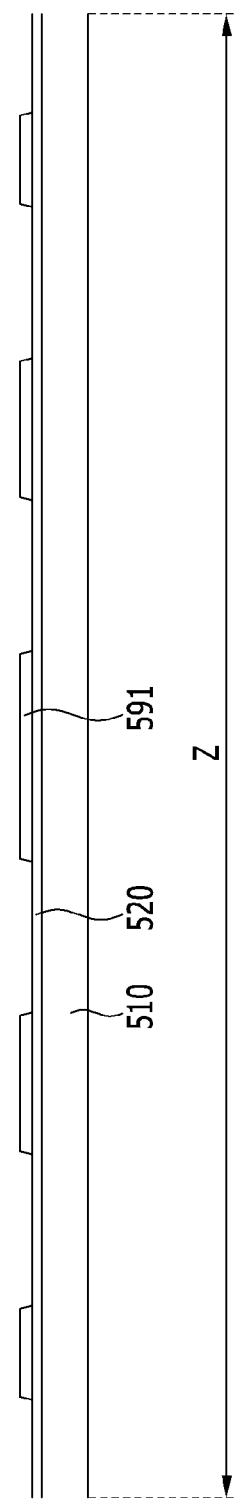

Referring to FIG. 9 and FIG. 10, the first insulating layer 520 is formed (using an organic insulating material or an inorganic insulating material) on an entire surface on the first substrate 510 (made of glass or plastic). The first substrate 510 may include a plurality of zones Z. Each zone Z may have a parallelogram shape, and the zones Z are disposed in parallel.

Subsequently, the first electrode 591 is formed on the first insulating layer 520 using a transparent conductive material, such as at least one of indium tin oxide (ITO) and indium zinc oxide (IZO). The first electrode 591 may have one or more features discussed with reference to FIG. 2, FIG. 3, and FIG. 4.

Figure 11:
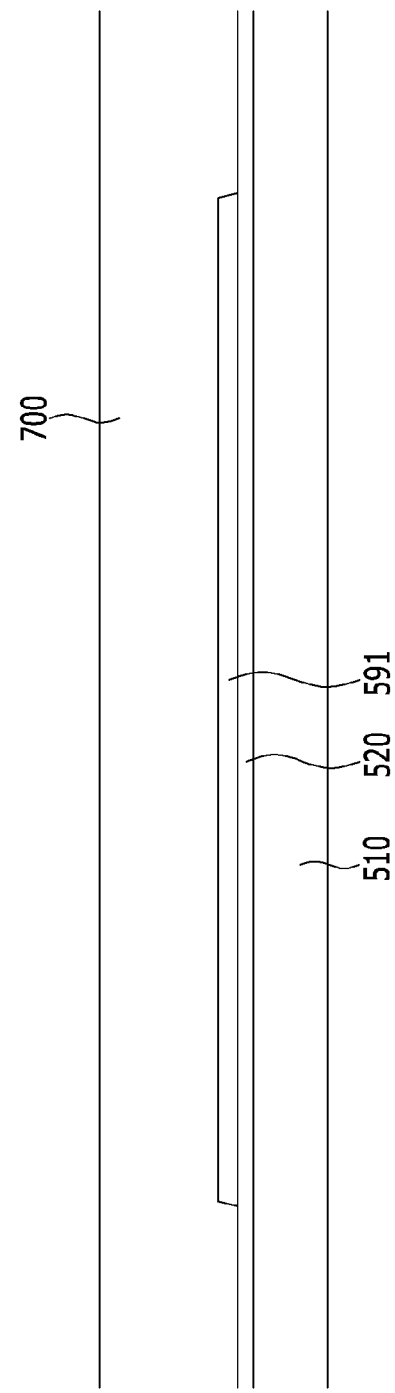
Figure 12:
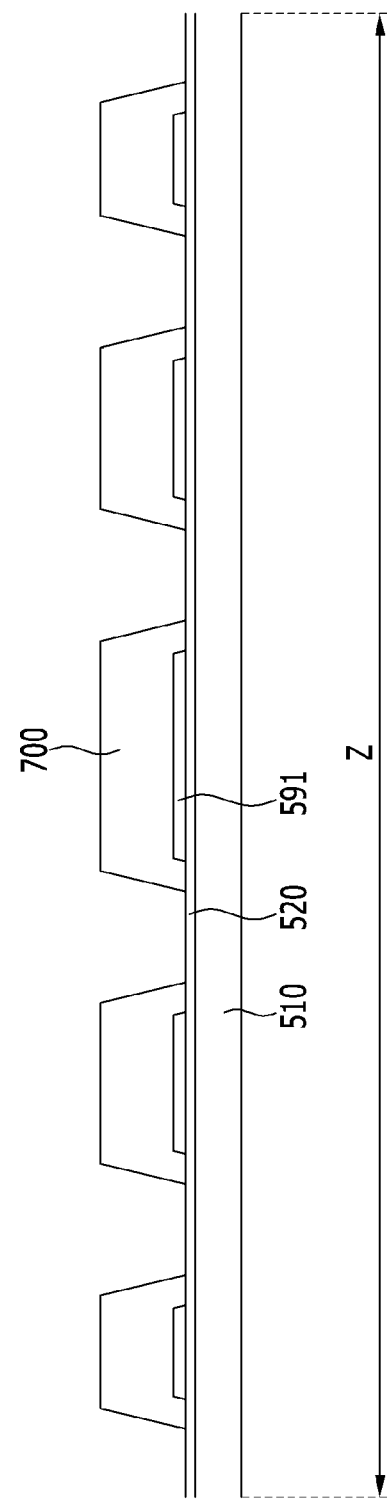

Referring to FIG. 11 and FIG. 12, a photosensitive organic material is coated on the first electrode 591 and is patterned through a photo-process to form first sacrificial layers 700 (or first-category sacrificial layers 700).

The first sacrificial layers 700 may cover first electrodes 591. Portions of the photosensitive organic material between first electrodes 591 may be substantially removed in the photo-process.

Figure 13:
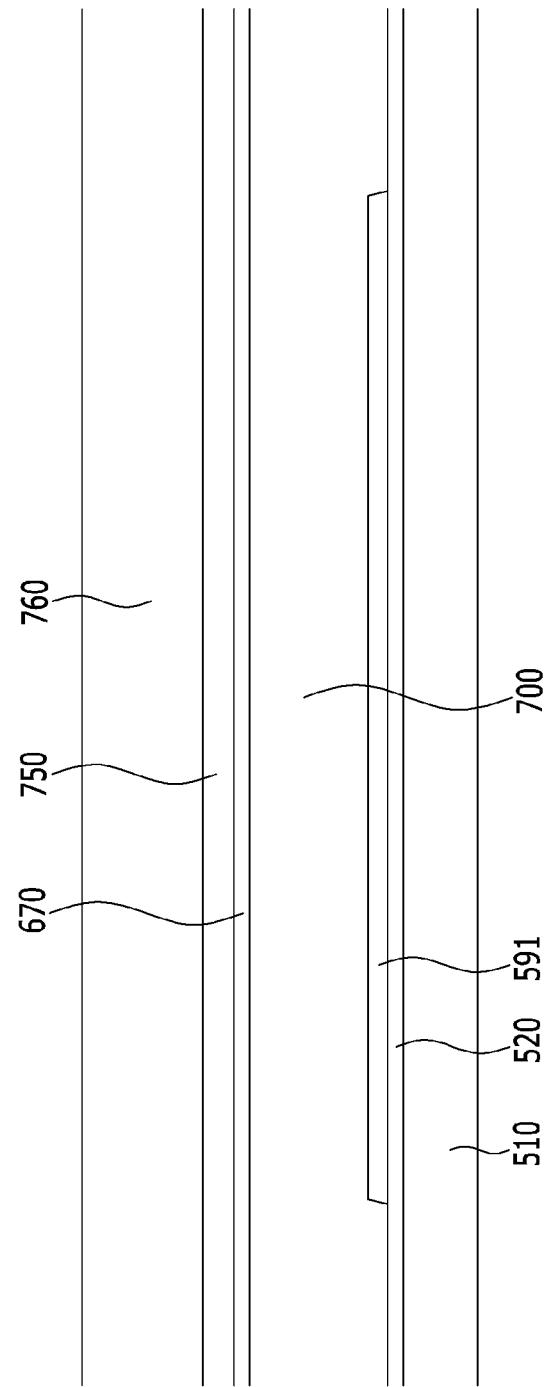
Figure 14:
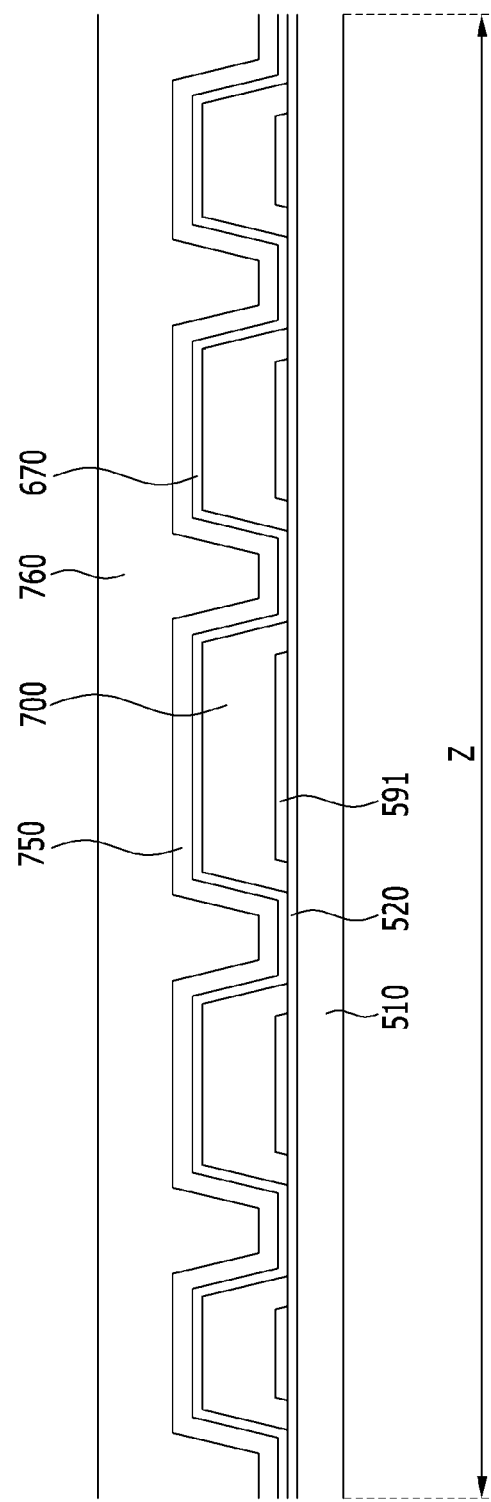

Referring to FIG. 13 and FIG. 14, the second electrode 670 is formed on the first sacrificial layers 700 using a transparent conductive material, such as at least one of indium tin oxide (ITO) and indium zinc oxide (IZO).

Subsequently, the second insulating layer 750 made of an inorganic insulating material, such as at least one of a silicon oxide ($SiO_x$) or a silicon nitride ($SiN_x$), may be formed on the second electrode 670.

Subsequently, an organic material is coated and patterned on the second insulating layer 750 to form the first roof layer 760. First-category portions of the first roof layer 760 may overlap the first electrodes 591. Second-category of the first roof layer 760 may be positioned between the first sacrificial layers 700 and/or between the first electrodes 591. The second-category portions of the first roof layer 760 may be thicker than the first-category portions of the first roof layer 760.

Figure 15:
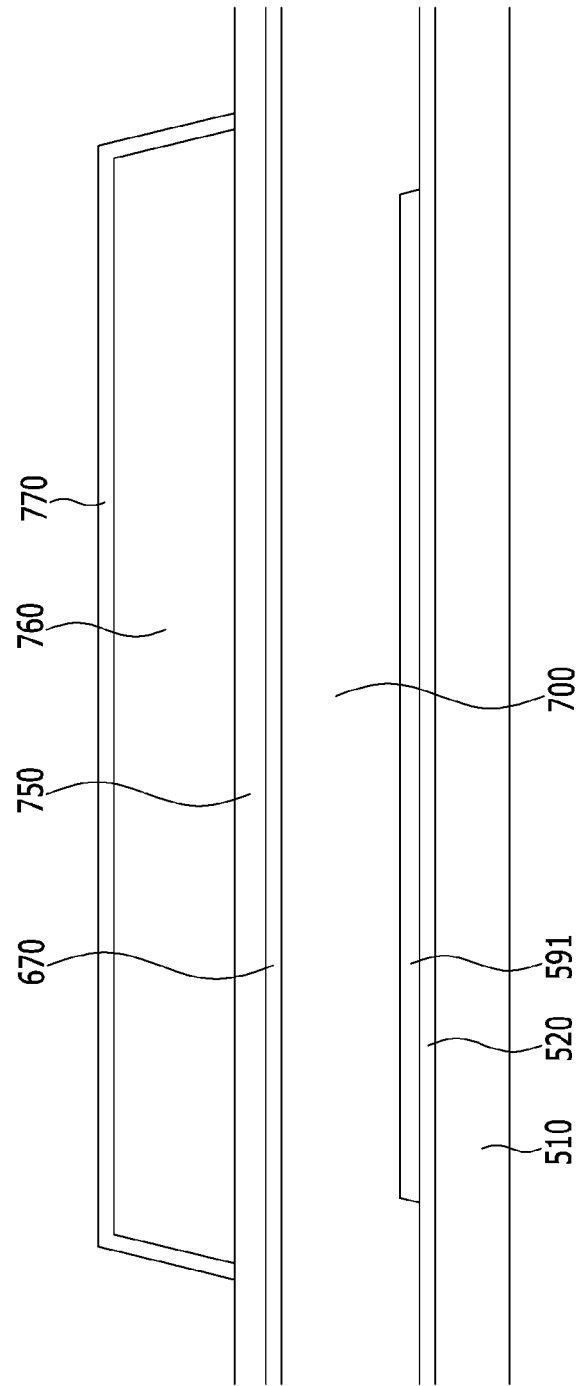
Figure 16:
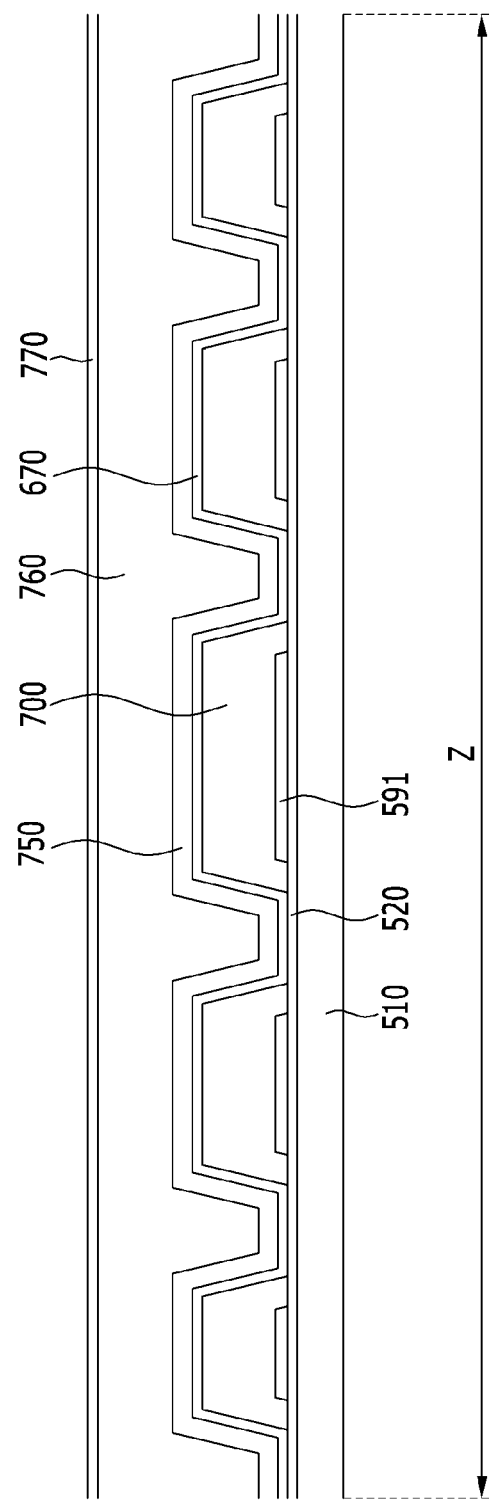
Figure 17:
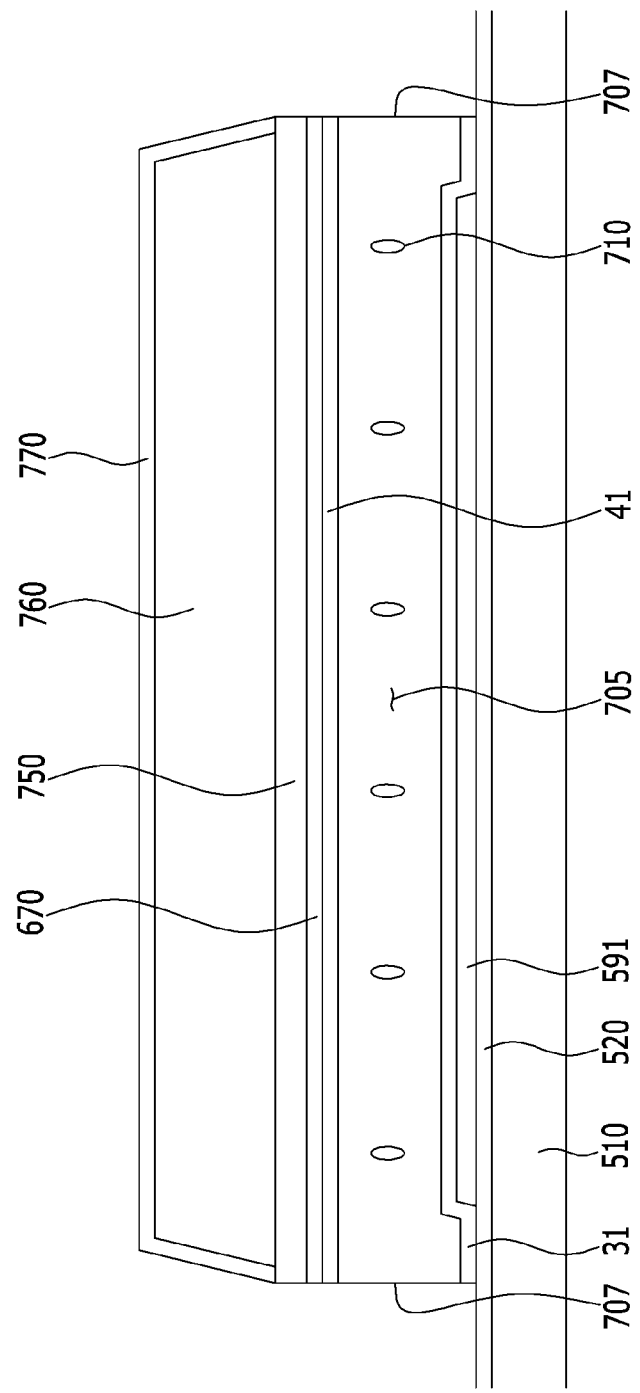
Figure 18:
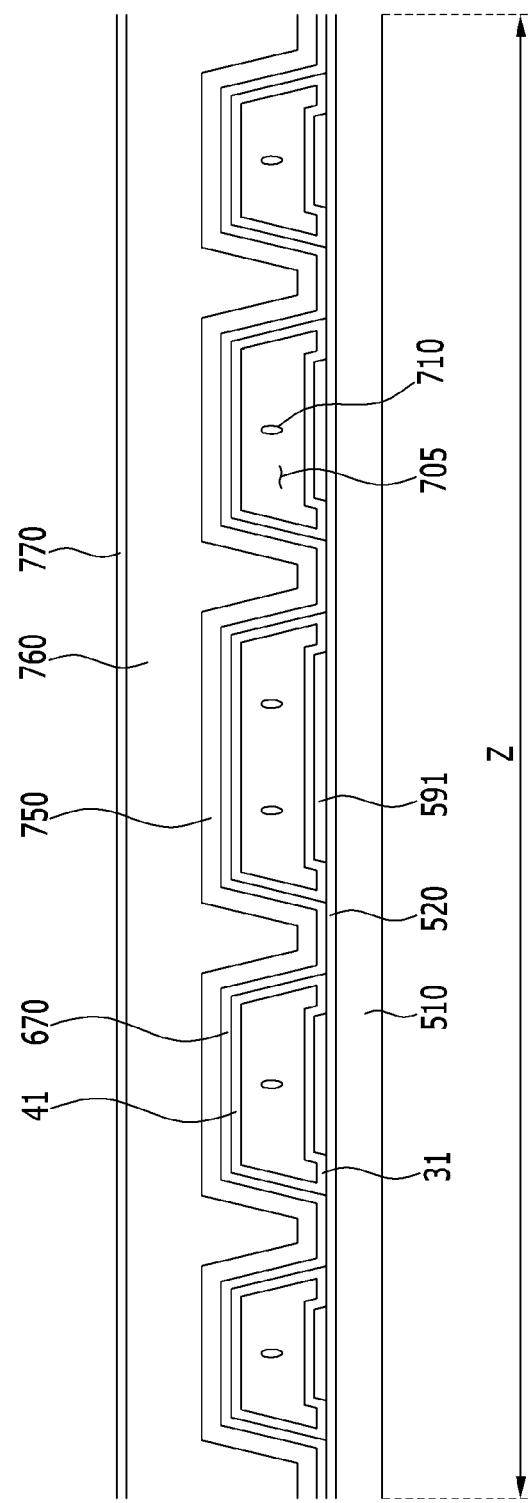

Referring to FIG. 15 and FIG. 16, the third insulating layer 770 made of an inorganic insulating material, such as at least one of silicon nitride (SiNx) and silicon oxide (SiOx), is formed on the first roof layer 760. The third insulating layer 770 may be patterned to remove portions of the third insulating layer 770 positioned at two edge portions of the first substrate 510 (e.g., the upper edge portion and the lower edge portion of the first substrate 510 related to a standing position of the display device). The third insulating layer 770 is patterned to cover side surfaces of the first roof layer 760, thereby protecting the first roof layer 760.

Referring to FIG. 15, FIG. 16, FIG. 17, and FIG. 18, the second insulating layer 750 and the second electrode 670 are patterned. As a result, portions of the first sacrificial layers 700 at two edge portions of the first substrate 510 (e.g., the upper edge portion and the lower edge portion of the first substrate 510 related to a standing position of the display device) are exposed.

Subsequently, a developer or a stripper solution is supplied on the exposed portions of the first sacrificial layers 700 to at least partially remove the first sacrificial layers 700, and an ashing process may be performed to substantially completely remove the first sacrificial layers 700.

After the first sacrificial layers 700 have been removed, the first microcavities 705 are formed at the positions where the first sacrificial layers 700 were positioned, between the first electrodes 591 and the second electrode 670. The second electrode 670 may cover upper portions and opposite side portions of the first microcavities 705.

The first microcavities 705 are exposed at first injection holes 707 (or first-category injection holes 707), where portions of the first roof layer 760 and the second electrode 670 are removed. The first injection holes 707 are formed at one or more of two edge portions of the first substrate 510 (e.g., the upper edge portion and the lower edge portions of the first substrate 510 related to a standing position of the display device). In an embodiment, the first injection holes 707 may be formed at only one of the two edge portions of the first substrate 510. In an embodiment, a first injection hole 707 may be formed at the center position of the first substrate 510.

Subsequently, the first substrate 510 is heated to harden the first roof layers 760, for maintaining the shapes of the first microcavities 705.

An aligning agent including an alignment material may be deposited on the first substrate 510 using a spin coating method or an inkjet method. The aligning agent may be provided into the first microcavities 705 through the first injection holes 707. In an embodiment, the hardening process is performed after the aligning agent has been provided inside the first microcavities 705. The solution component in the aligning agent may be substantially evaporated in the hardening process, and the alignment material may remain at wall surfaces of the first microcavities 705.

Accordingly, the first lower alignment layers 31 may be formed on the first electrodes 591, and the first upper alignment layers 41 may be formed under the second electrode 670. A first lower alignment layer 31 and a first upper alignment layer 41 may be substantially separated by a first microcavity 705 and may connect to each other at edges of the first microcavity 705.

In an embodiment, the first lower alignment layers 31 and the first upper alignment layers 41 may be vertical alignment layers or horizontal alignment layers. In an embodiment, a UV irradiation process is performed on the alignment layers to form pre-tilted structures.

Subsequently, a liquid crystal material is deposited on the first substrate 510 through an inkjet method or a dispensing method. The liquid crystal material is injected into the first microcavities 705 through the first injection holes 707. Through capillary action, liquid crystal material positioned near the first injection holes 707 may pass through the first injection holes 707 into the first microcavities 705. The liquid crystal material may substantially fill the first microcavities 705 to form the first liquid crystal layers, which include the liquid crystal molecules 710.

At least one of the first electrode 591 and the second electrode 670 may be formed of a material having the same refractive index as the liquid crystal molecules 710 of the first liquid crystal layer. Advantageously, distortion of light passing through the image control panel 500 may be minimized or prevented.

Figure 19:
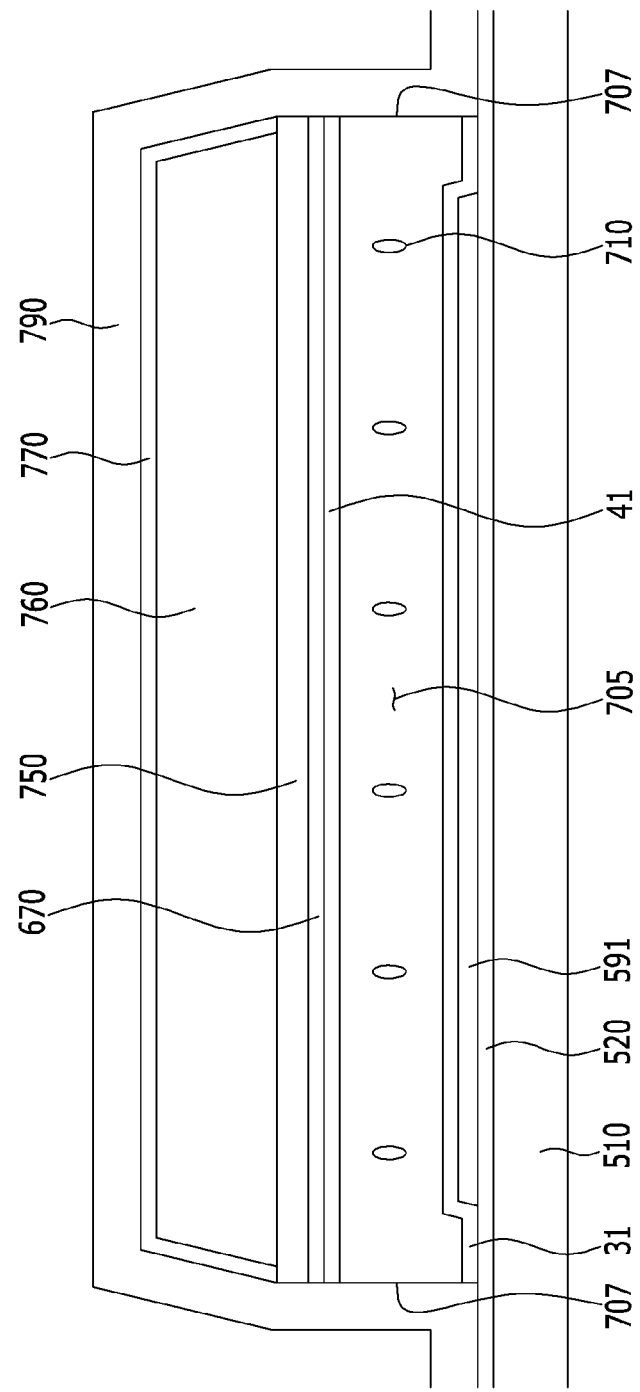
Figure 20:
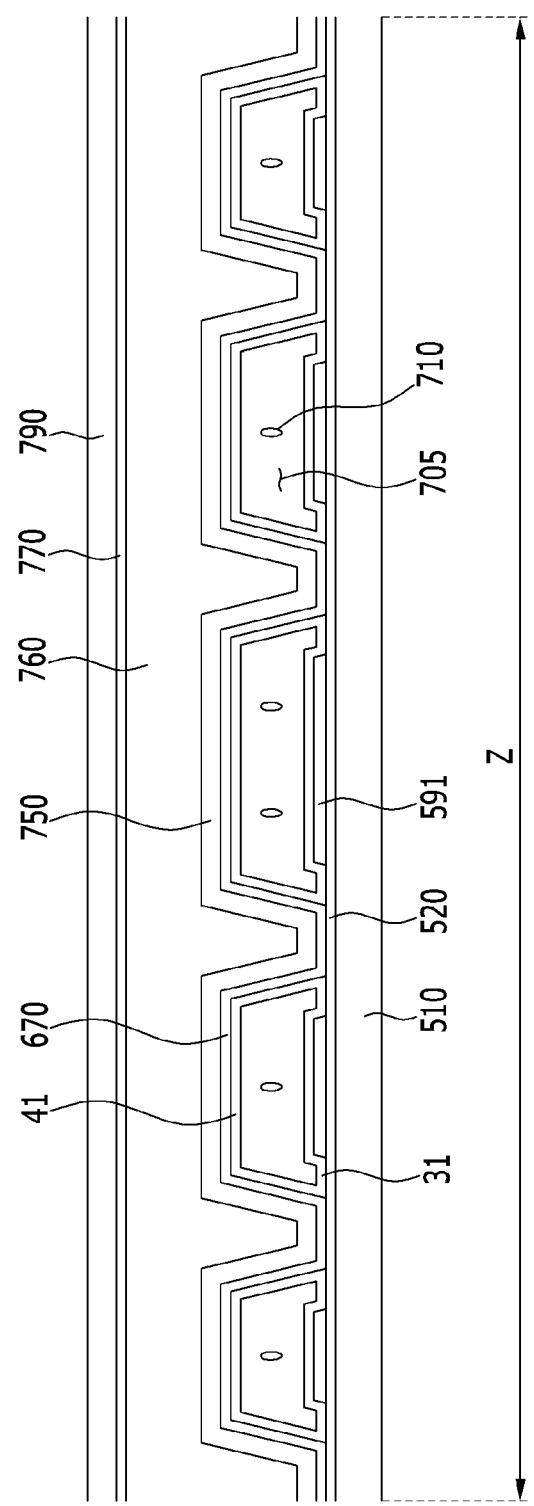

Referring to FIG. 19 and FIG. 20, a material that does not substantially react with the liquid crystal molecules 710 is deposited on the third insulating layer 770 to form the first encapsulation layer 790. For example, the first encapsulation layer 790 may be made of PARYLENE. The first encapsulation layer 790 covers the first injection holes 707 to seal the first microcavities 705.

FIG. 21 to FIG. 32 are process cross-sectional views illustrating a manufacturing process of the display panel 100 according to an embodiment of the present invention. FIG. 21, FIG. 23, FIG. 25, FIG. 27, FIG. 29, and FIG. 31 are cross-sectional views taken along a same line. FIG. 22, FIG. 24, FIG. 26, FIG. 28, FIG. 30, and FIG. 32 are cross-sectional views taken along a same line.

Figure 21:
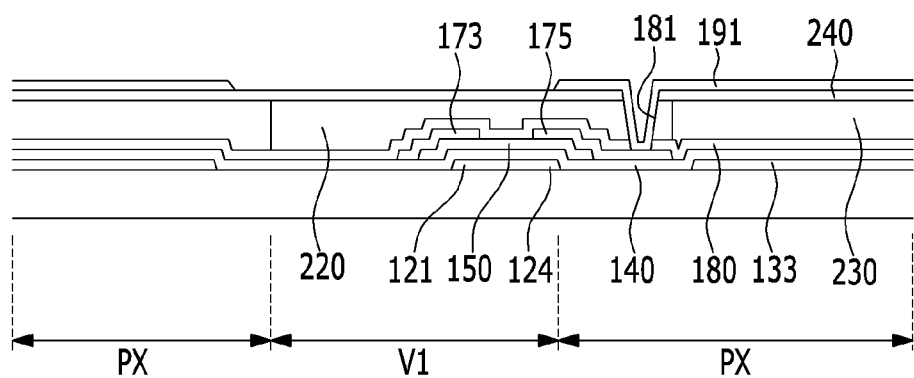
FIG. 21 to FIG. 32 are process cross-sectional views illustrating a manufacturing process of a display panel of a display device according to an embodiment of the present invention.
Figure 22:
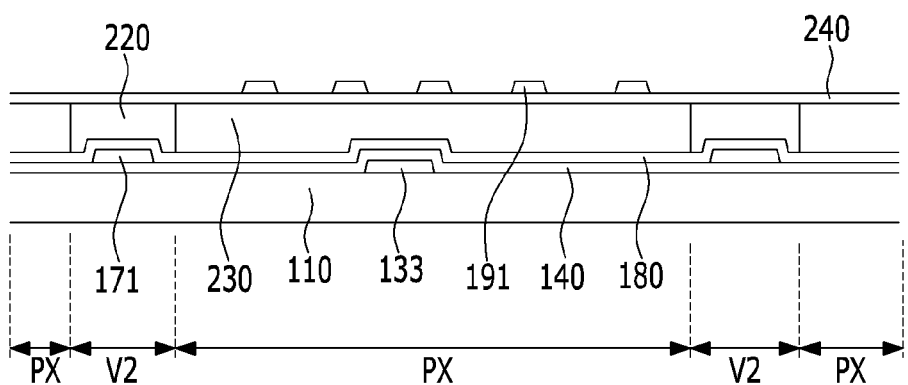

Referring to FIG. 21 and FIG. 22, the gate line 121 and the gate electrode 124 protruding from the gate line 121 are formed on the second substrate 110 made of glass or plastic. The storage electrode 133 is separated (and electrically insulated) from the gate line 121 and the gate electrode 124. The storage electrode 133 may be formed of the same material as the gate line 121 and the gate electrode 124.

Subsequently, the gate insulating layer 140 made of the inorganic insulating material, such as silicon oxide ($SiO_x$) or silicon nitride ($SiN_x$) is formed on the entire surface of the second substrate 110, covering the gate line 121, the gate electrode 124, and the storage electrode 133. The gate insulating layer 140 may have a single-layer structure or a multilayer structure.

Subsequently, a semiconductor material such as amorphous silicon, polycrystalline silicon, and a metal oxide is deposited on the gate insulating layer 140 and patterned to form the semiconductor 150. The semiconductor 150 may overlap the gate electrode 124.

Subsequently, a metal material is deposited and patterned to form the data line 171. The source electrode 173 (which protrudes from the data line 171 and overlaps the semiconductor 150) and the drain electrode 175 (which is separated from the source electrode 173) are formed. The metal material may have a single-layer structure or a multilayer structure.

The semiconductor material and the metal material may be sequentially deposited and simultaneously patterned to form the semiconductor 150, the data line 171, the source electrode 173, and the drain electrode 175. The semiconductor 150 may extend under the data line 171.

The gate electrode 124, the semiconductor 150, the source electrode 173, and the drain electrode 175 form a thin film transistor. The gate line 121 and the data line 171 may cross each other, and a plurality of pixel areas (PX) may be defined by the gate lines 121 and the data lines 171.

Subsequently, the passivation layer 180 is formed on the data line 171, the source electrode 173, the drain electrode 175, and a portion of the semiconductor 150 exposed between the source electrode 173 and the drain electrode 173. The passivation layer 180 may be made of an organic insulating material or an inorganic insulating material. The passivation layer 180 may have a single-layer or multilayer structure.

Subsequently, a color filter 230 is formed in each pixel area PX on the passivation layer 180. Color filters 230 of the same color may be formed according to a column direction of the plurality of pixel areas PX. In an embodiment, the color filters 230 have three colors. The color filters 230 of the first color are formed, and then the color filters 230 of the second color are formed by shifting a mask. After the color filters 230 of the second color have been formed, the color filters 230 of the third color may be formed by shifting the mask.

Subsequently, the light blocking member 220, which overlaps the thin film transistor, is formed at boundaries of pixel areas (PX) on the passivation layer 180.

In an embodiment, the light blocking member 220 is formed after the color filters 230 have been formed. In an embodiment, the color filters 230 may be formed after the light blocking member 220 has been formed.

The fourth insulating layer 240 made of the inorganic insulating material such as at least one of silicon nitride (SiNx) and silicon oxide (SiOx) is then formed on the color filters 230 and the light blocking member 220.

Subsequently, the fourth insulating layer 240, the light blocking member 220, and the passivation layer 180 are etched to form the contact hole 181 for exposing a portion of the drain electrode 175.

A transparent metal material such as at least one of indium-tin oxide (ITO) and indium-zinc oxide (IZO) is then deposited and patterned on the fourth insulating layer 240 to form the pixel electrodes 191 in the pixel areas PX. A pixel electrode 191 is connected to the drain electrode 175 through the contact hole 181.

Figure 23:
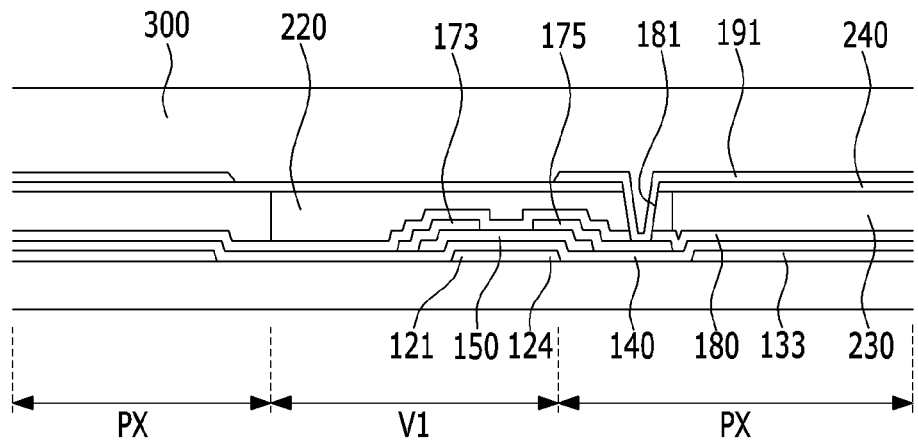
Figure 24:
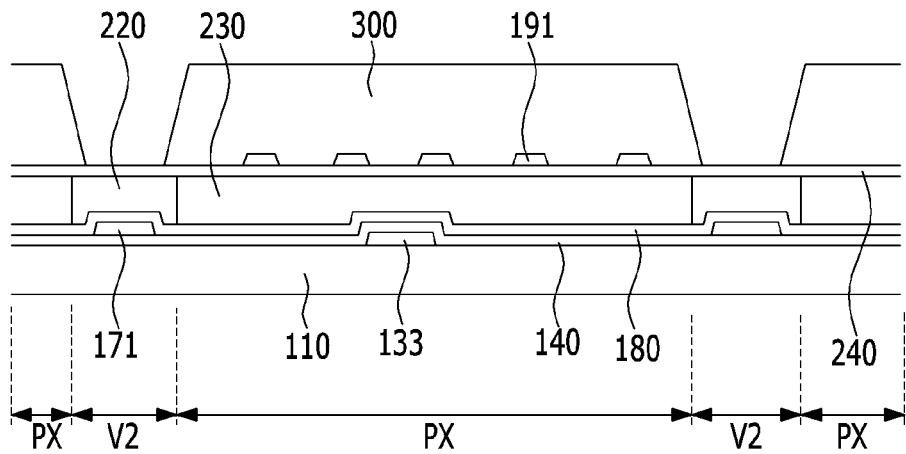

Referring to FIG. 23 and FIG. 24, a photosensitive organic material is coated on the pixel electrode 191 and a photo-process is performed to form second sacrificial layers 300 (or second-category sacrificial layers 300).

Each of the second sacrificial layers 300 may extend in a pixel column direction. The second sacrificial layers 300 may cover pixel areas PX in pixel columns and may cover portions of the first valleys V1 positioned between subpixel areas PX.

Figure 25:
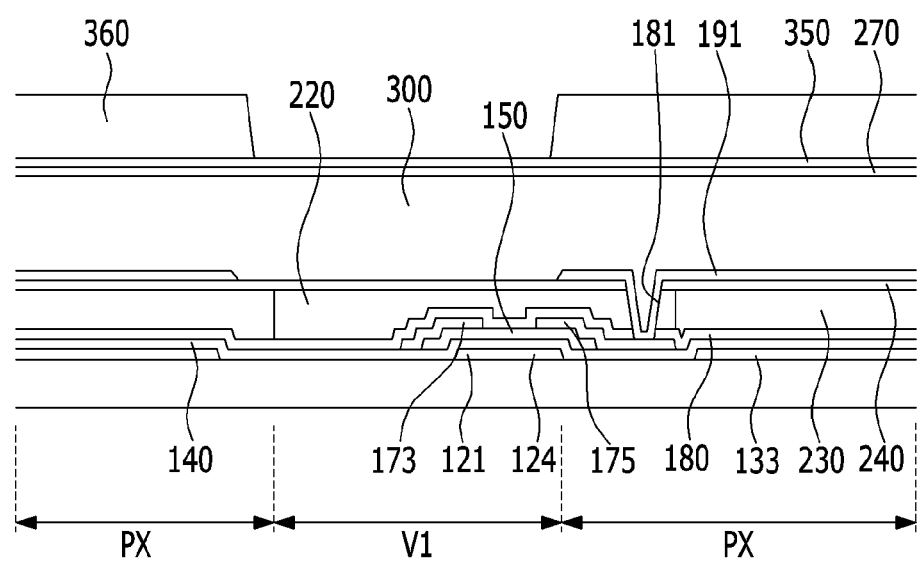
Figure 26:
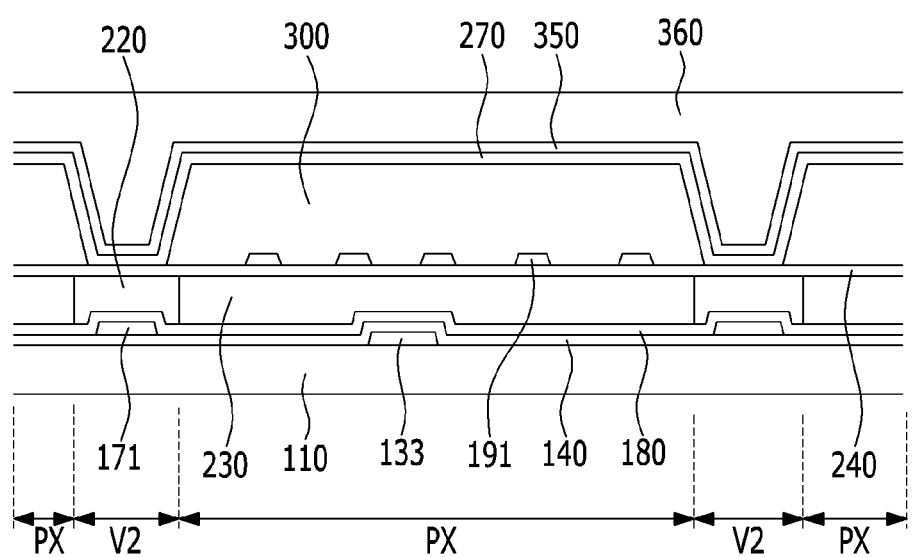

Referring to FIG. 25 and FIG. 26, the common electrode 270 is formed by depositing a transparent metal material such as at least one of indium tin oxide (ITO) and indium zinc oxide (IZO) on the second sacrificial layers 300. A photosensitive film is coated on the common electrode 270.

The fifth insulating layer 350 made of an inorganic insulating material such as silicon oxide ($SiO_x$) or silicon nitride ($SiN_x$) is formed on the common electrode 270.

Subsequently, an organic material is coated on the fifth insulating layer 350 and patterned to form the second roof layer 360. Portions of the organic material positioned at the first valleys V1 may be patterned to be removed. Accordingly, each of the second roof layers 360 may extend in a pixel row direction.

Figure 27:
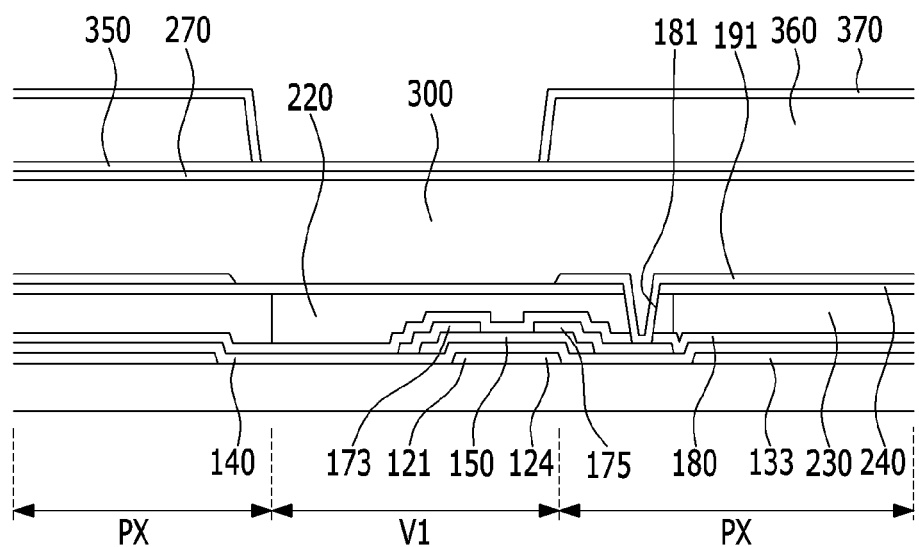
Figure 28:
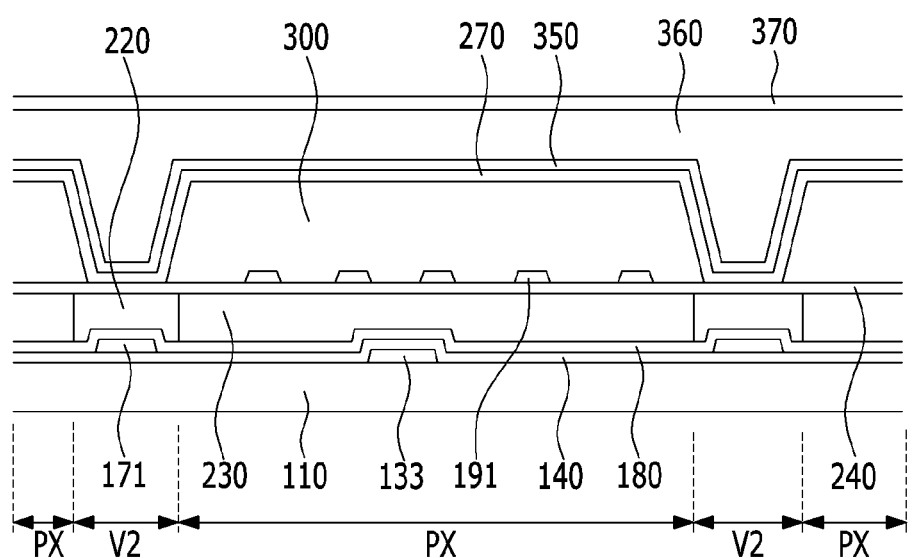

Referring to FIG. 27 and FIG. 28, the sixth insulating layer 370 made of the inorganic insulating material such as at least one of silicon nitride (SiNx) and silicon oxide (SiOx) is formed on the second roof layer 360. The sixth insulating layer 370 is patterned to remove portions of the sixth insulating layer 370 positioned at the first valleys V1. The sixth insulating layer 370 may cover side surfaces of the second roof layers 360, thereby protecting the second roof layers 360.

Figure 29:
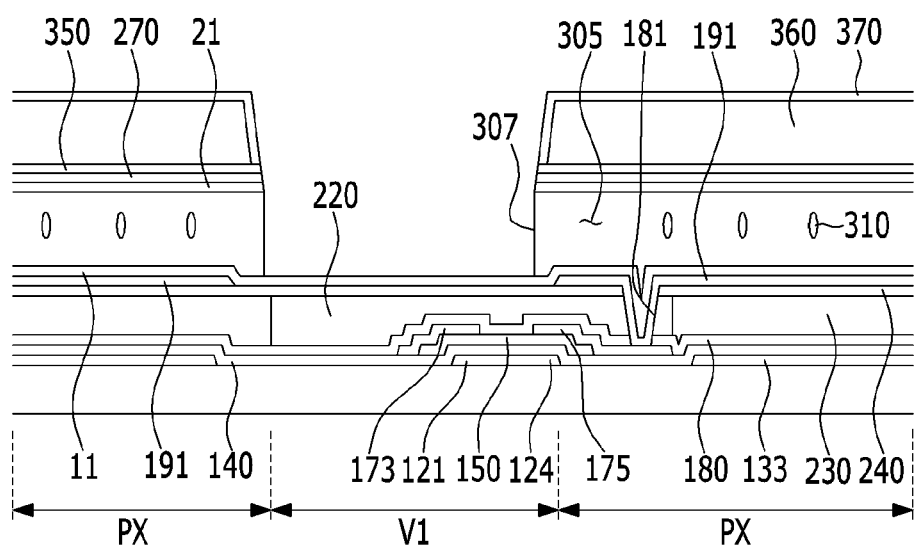
Figure 30:
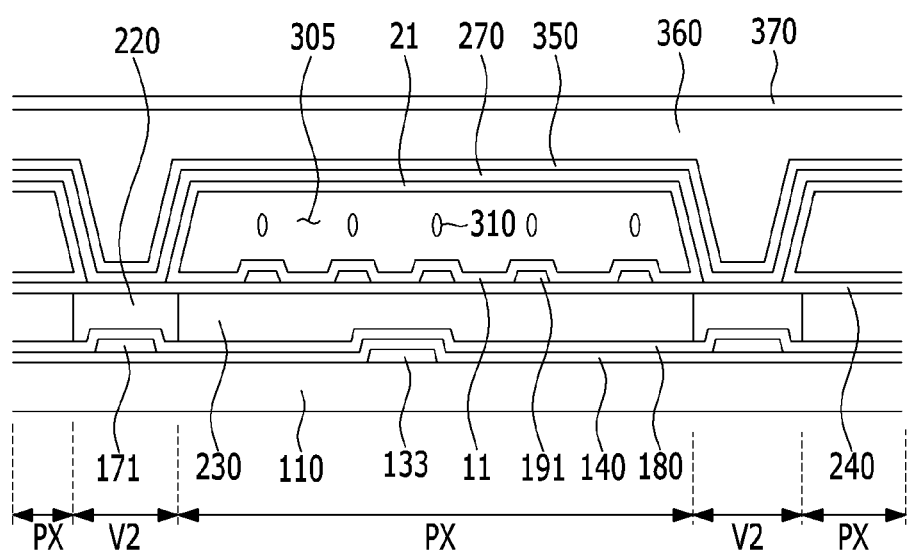

Referring to FIG. 29 and FIG. 30, portions of the fifth insulating layer 350 and the common electrode 270 positioned at the first valleys V1 may be removed. As a result, portions of the second sacrificial layers 300 may be exposed.

Subsequently, a developer or a stripper solution is supplied on exposed portions of the second sacrificial layers 300 to at least partially remove the second sacrificial layers 300, and an ashing process may be performed to substantially completely remove the second sacrificial layer 300.

After the second sacrificial layers 300 have been removed, the second microcavities 305 are formed where the second sacrificial layers 300 were positioned, between the pixel electrodes 191 and the common electrode. The common electrode 270 and the second roof layer 360 may cover upper portions and side portions of the second microcavities 305.

The second microcavities 305 are exposed at second injection holes 307 (or second-category injection holes 307), where portions of the second roof layer 360 and the common electrode 270 are removed. The second injection holes 307 may be formed at opposite edges of each pixel area PX.

Subsequently, the second substrate 110 is heated to harden the second roof layers 360, for maintaining the shapes of the second microcavities 305.

Subsequently, an aligning agent including an alignment material is deposited on the second substrate 110 using a spin coating method or an inkjet method. The aligning agent may be provided into the second microcavities 305 through the second injection holes 307. In an embodiment, the hardening process is performed after the aligning agent has been provided inside the second microcavities 305. The solution component in the aligning agent may be substantially evaporated in the hardening process, and the alignment material may remain at wall surfaces of the second microcavities 305.

Accordingly, the second lower alignment layers 11 may be formed on the pixel electrode 191, and the second upper alignment layers 21 may be formed under the common electrode 270. A second lower alignment layer 11 and a second upper alignment layer 11 may be substantially separated by a second microcavity 305 and may connect to each other edges of the second microcavity 305.

In an embodiment, the second lower alignment layers 11 and the second upper alignment layers 21 may be vertical alignment layers or horizontal alignment layers. In an embodiment, a UV irradiation process is performed on the alignment layers to form pre-tilt structures.

Subsequently, a liquid crystal material is deposited on the first substrate 110 through an inkjet method or a dispensing method. The liquid crystal material is injected into the second microcavities 305 through the second injection holes 307. Through capillary action, liquid crystal material positioned near the second injection holes 307 passes through the second injection holes 307 into the second microcavities 305. The liquid crystal material may substantially fill the second microcavities 305 to form the second liquid crystal layers, which include the liquid crystal molecules 310.

Figure 31:
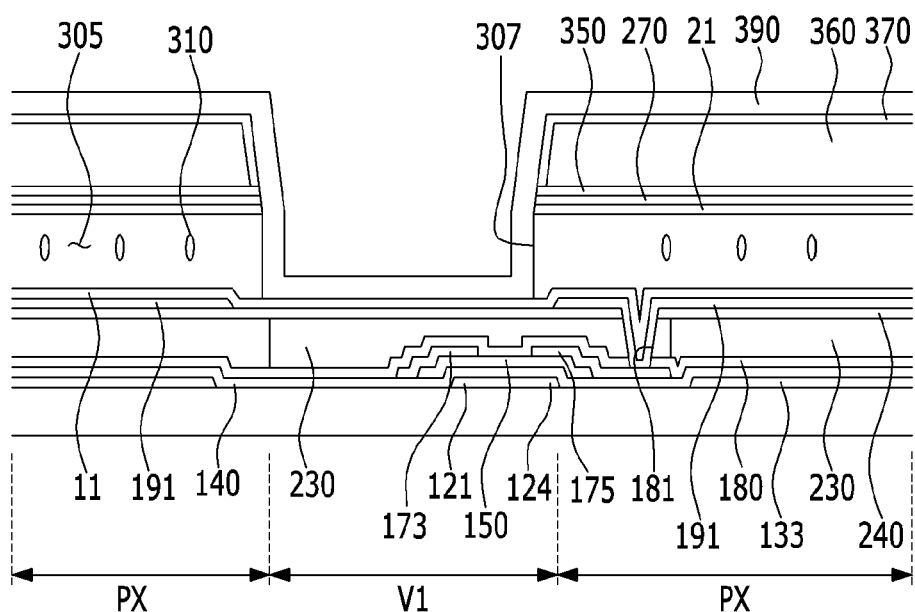
Figure 32:
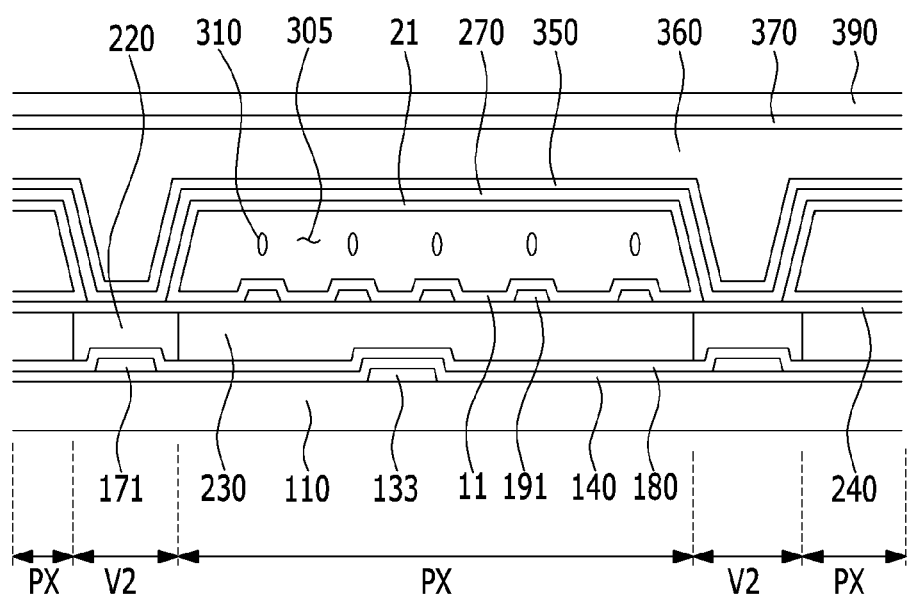

Referring to FIG. 31 and FIG. 32, a material that does not substantially react with the liquid crystal molecule 310 is deposited on the sixth insulating layer 370 to form the second encapsulation layer 390. For example, the second encapsulation layer 390 may be formed of PARYLENE. The second encapsulation layer 390 covers the second injection holes 307 to seal the second microcavities 305.

Figure 33:
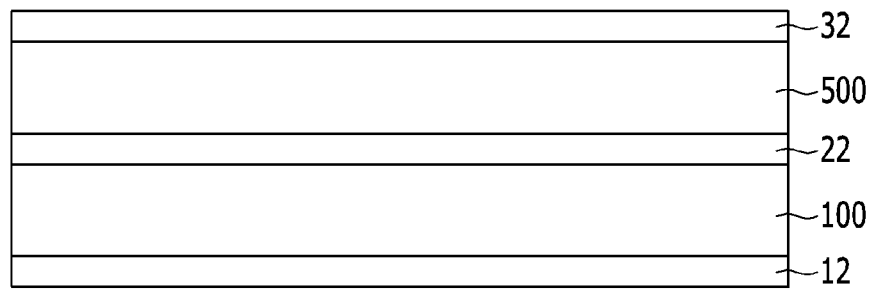
FIG. 33 and FIG. 34 are cross-sectional views illustrating a display device according to an embodiment of the present invention.
Figure 34:
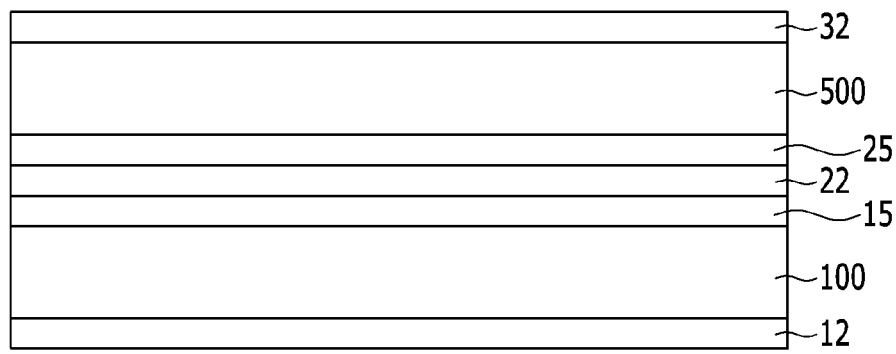

FIG. 33 and FIG. 34 are cross-sectional views illustrating a display device according to an embodiment of the present invention.

As illustrated in FIG. 33, the image control panel 500 may overlap the display panel 100. A first polarizer 12 is positioned outside the display panel 100, a second polarizer 22 is positioned between the display panel 100 and the image control panel 500, and a third polarizer 32 is positioned outside the image control panel 500.

The first polarizer 12 and the second polarizer 22 may be respectively formed (and/or positioned) at two opposite surfaces of the display panel 100. The third polarizer 32 may be formed at a surface of the image control panel 500. Subsequently, the display panel 100 and the image control panel 500 are attached to each other, such that the second polarizer 22 is positioned between the display panel 100 and the image control panel 500.

In an embodiment, the second polarizer 22 may be formed at a surface of the image control panel 500 before being attached to the display panel 100.

The display panel 100 and the image control panel 500 may be separated by a predetermined interval. The predetermined interval may be maintained by a substrate and/or an adhesion member disposed between the display panel 100 and the image control panel 500.

A first adhesion member 15 may be formed (and/or positioned) between the display panel 100 and the second polarizer 22, and a second adhesion member 25 may be formed (and/or positioned) between the second polarizer 22 and the image control panel 500. The thicknesses of the first adhesion member 15 and the second adhesion member 25 may be appropriately predetermined according to a focal distance and/or a viewing distance for normally and/or optimally forming images. The first adhesion member 15 may directly contact each of the second encapsulation layer 390 and the second polarizer 22. One of the first adhesion member 15 and the second adhesion member 25 may be omitted.

Figure 35:
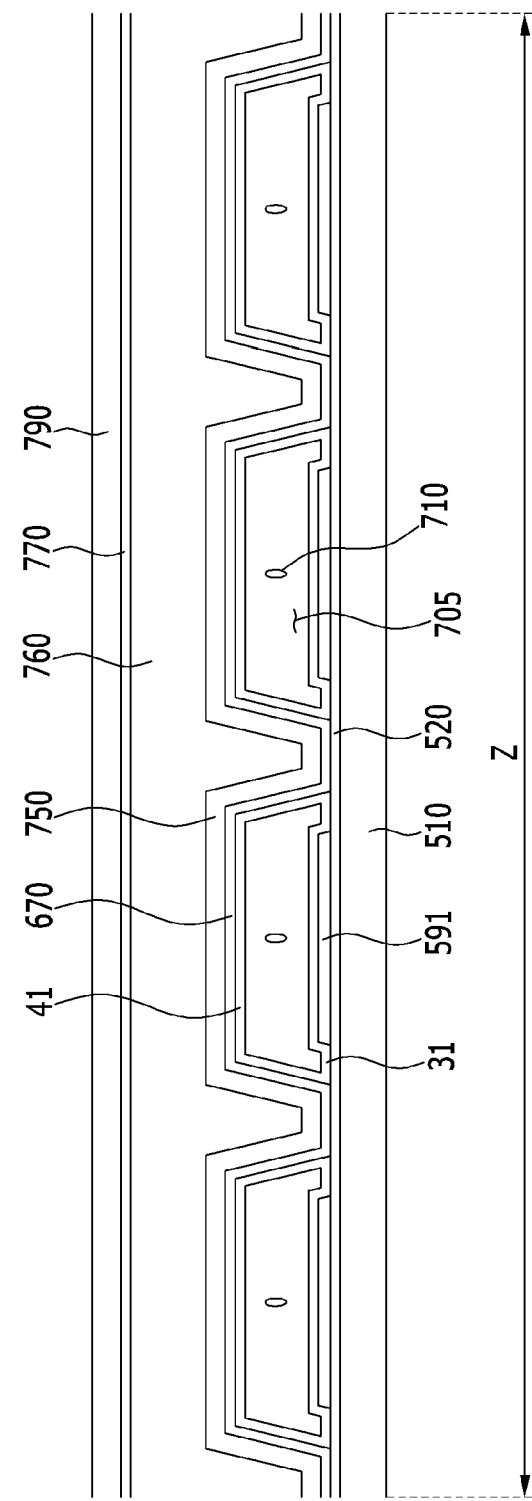
FIG. 35 is a cross-sectional view illustrating an image control panel of a display device according to an embodiment of the present invention.

FIG. 35 is a cross-sectional view illustrating an image control panel of a display device according to an embodiment of the present invention.

The image control panel illustrated in FIG. 35 may include one or more features discussed with reference to FIG. 1 to FIG. 4 and FIG. 9 to FIG. 20.

In an embodiment, as illustrated in FIG. 35, the first electrodes 591 have a same width in a direction parallel to the bottom surface of the first substrate 510. The intervals between the first electrodes 591 may have a same width in the direction. The first microcavities 705 may have a same width in the direction.

A barrier driving signal may be applied to the first electrodes 591, and a constant voltage may be applied to the second electrode 670. Accordingly, an electric field may be formed between the first electrode 591 and the second electrode 670 for controlling transmission of light emitted from the display panel 100.

A first signal may be applied to odd-numbered first electrodes 591 among the first electrodes 591, and a second signal (different from the first signal) may be applied to even-numbered first electrodes 591 among the first electrodes 591. In an embodiment, when the odd-numbered first electrodes 591 are applied with a high voltage, the even-numbered first electrodes 591 may be applied with a low voltage. In an embodiment, when the even-numbered first electrodes 591 are applied with a high voltage, the odd-numbered first electrodes 591 may be applied with a low voltage.

Figure 36:
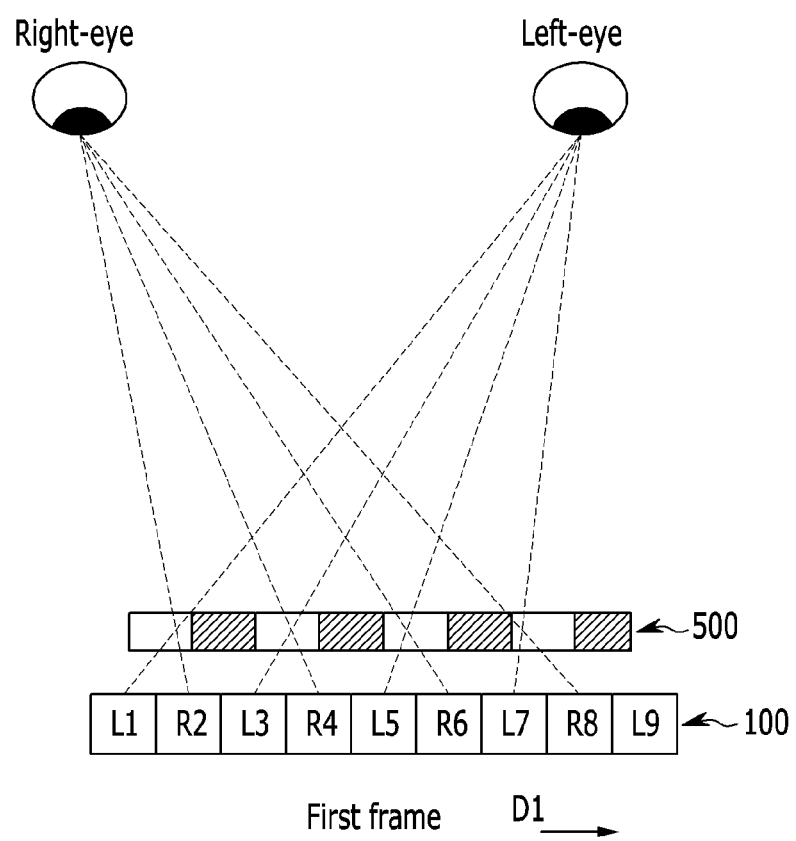
FIG. 36 is a schematic view illustrating a process in which an image provided by a display device according to an embodiment of the present invention is perceived by a viewer in an odd-numbered frame.
Figure 37:
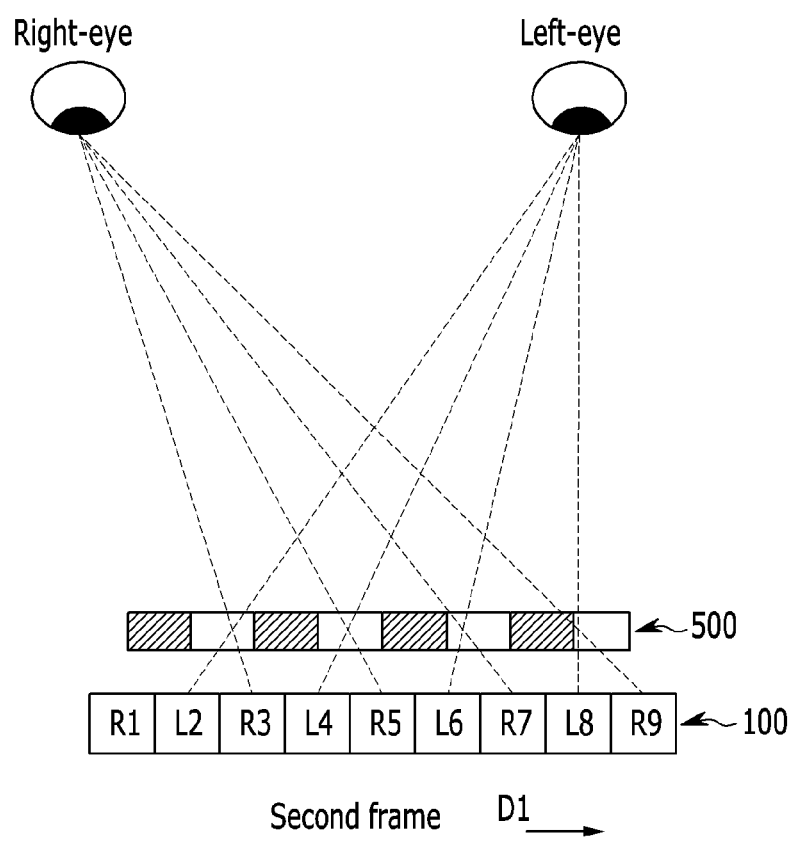
FIG. 37 is a schematic view illustrating a process in which an image provided by a display device according to an embodiment of the present invention is perceived by a viewer in an even-numbered frame.
Figure 38:
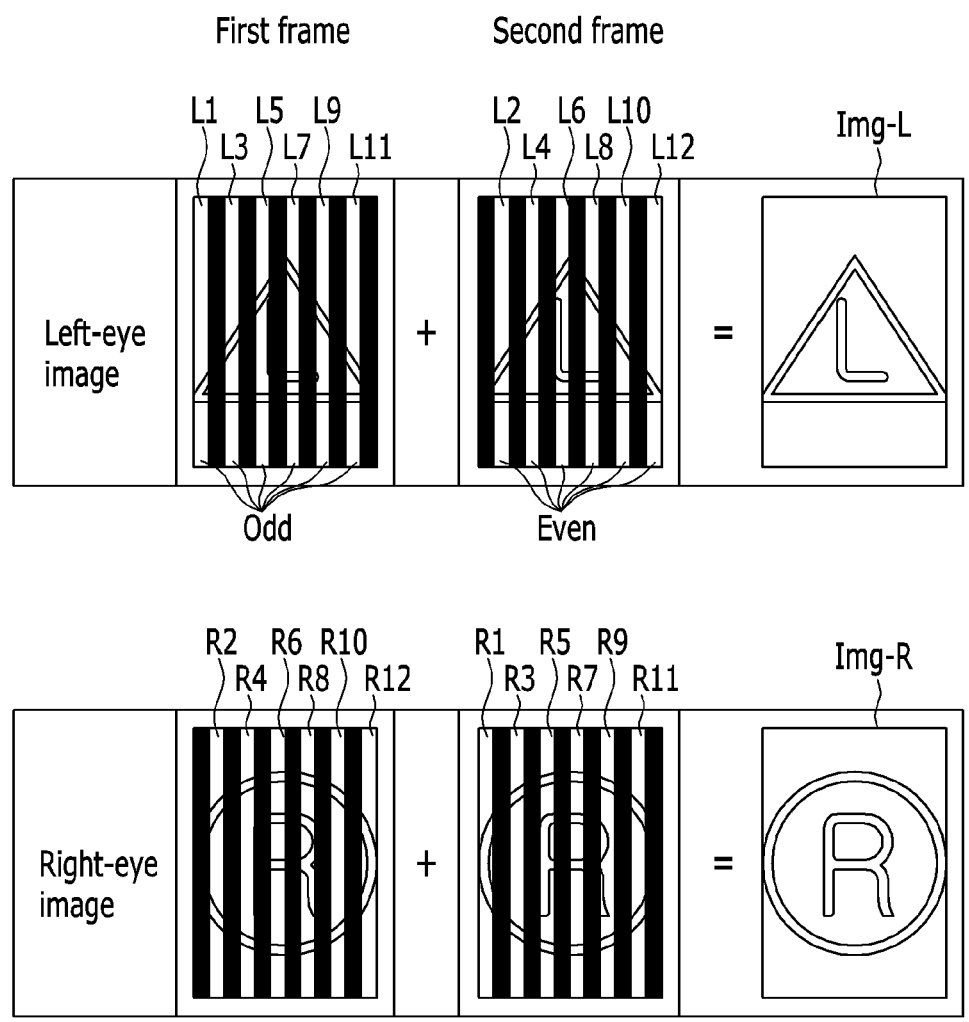
FIG. 38 is a schematic view illustrating a process in which an image provided by a display device according to an embodiment of the present invention is perceived by a viewer in two continuous frames.

FIG. 36 is a schematic view illustrating a process in which an image provided by a display device according to an embodiment of the present invention is perceived by a viewer in an odd-numbered frame. FIG. 37 is a schematic view illustrating a process in which an image provided by a display device according to an embodiment of the present invention is perceived by a viewer in an even-numbered frame. FIG. 38 is a schematic view illustrating a process in which an image provided by a display device according to an embodiment of the present invention is perceived by a viewer in two continuous frames.

The display device may operate in an autostereoscopic 3D mode, in which the image control panel 500 (e.g., illustrated in FIG. 4 and/or FIG. 35) may control transmission of light (i.e., images) provided by the display panel 100.

As illustrated in FIG. 36, in a first frame (e.g., an odd-numbered frame), a plurality of pixels of the display panel 100 may alternately display first left-eye images (e.g., images L1, L3, L5, L7, and L9) and first right-eye images (e.g., images R2, R4, R6, and R8) in a first direction D1. The image control panel 500 may form transmission (open) regions and blocking (closed) regions that are alternately arranged in the first direction D1. Each blocking region and each transmission region may extend in a second direction D2 substantially perpendicular to the first direction D1 and substantially parallel to a bottom surface of the first substrate 510.

Each blocking region may correspond to at least one first electrode 591 of an image control panel 500. Each transmission region may correspond to at least one first electrode 591 of the image control panel 500. A transmission region or a blocking region may be formed according to the voltage applied to the corresponding first electrode 591. In an embodiment, a blocking region may be formed if no voltage is applied to a first electrode 591, and a transmission region may be formed if a high voltage is applied to the first electrode 591.

In the first frame, the first left-eye images L1, L3, L5, L7, and L9 are seen by the left eye of a viewer through the transmission regions of the image control panel 500, and the first right-eye images R2, R4, R6, and R8 are seen by the right eye of the viewer through the transmission regions of the image control panel 500.

As illustrated in FIG. 37, in a second frame (e.g., an even-numbered frame) immediately following the first frame, pixels displaying left-eye images and pixels displaying right-eye images may be reversed. In an embodiment, the pixels that displayed the first left-eye images L1, L3, . . . , and L9 in the first frame may display the second right-eye images R1, R3, R5, . . . , and R9 in the second frame, and the pixels that displayed the first right-eye images R2, R4, R6, and R8 in the first frame may display the second left-eye images L2, L4, L6, and L8 in the second frame. Each transmission region in the first frame is changed into a blocking region in the second frame, and each blocking region is changed into a transmission region in the second frame.

In the second frame, the second left-eye images L2, L4, L6, and L8 may be seen by the left eye of the viewer through the transmission regions of the image control panel 500, and the second right-eye images R1, R3, R5, R7, and R9 may be seen by the right eye of the viewer through the transmission regions of the image control panel 500.

Referring to FIG. 38, the first left-eye images L1, L3, L5, L7, and L9 are seen by the left eye of the viewer in the first frame, and the second left-eye images L2, L4, L6, and L8 are seen by the left eye of the viewer in the second frame. The first right-eye images R2, R4, R6, and R8 are seen by the right eye of the viewer in the first frame, and the second right-eye images R1, R3, R5, R7, and R9 are seen by the right eye of the viewer in the second frame. In an embodiment, since the images are displayed at a frame frequency of at least 60 Hz, such that the brain of the viewer may combine the first left-eye images L1, L3, L5, L7, and L9 with the second left-eye images L2, L4, L6, and L8 to form a left-eye combination image Img-L, and the brain of the viewer may combine the first right-eye images R2, R4, R6, and R8 with the second right-eye images R1, R3, R5, R7, and R9 to form a right-eye combination image Img-R. The brain of the viewer may combine the left-eye combination image Img-L and the right-eye combination image Img-R to perceive a stereoscopic image that has a depth.

Figure 39:
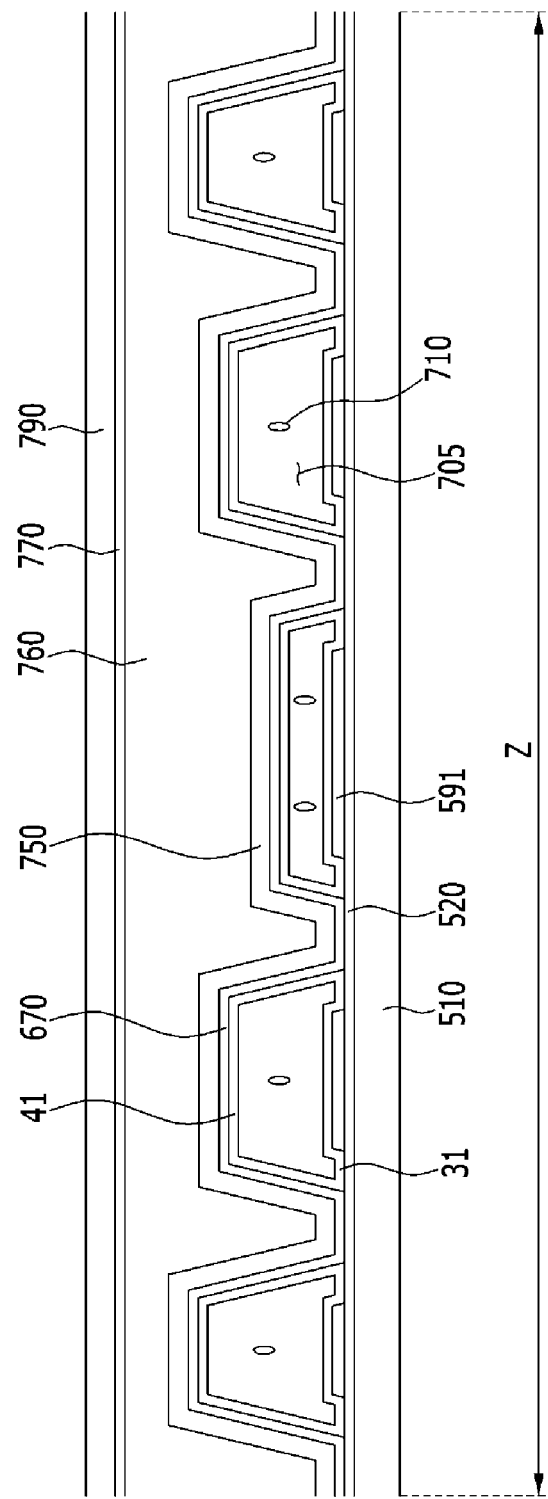
FIG. 39 is a cross-sectional view illustrating an image control panel of a display device according to an embodiment of the present invention.

FIG. 39 is a cross-sectional view illustrating an image control panel of a display device according to an embodiment of the present invention. The image control panel illustrated in FIG. 35 may include one or more features discussed with reference to FIG. 1 to FIG. 4 and FIG. 9 to FIG. 20.

In an embodiment, as illustrated in FIG. 39, the heights of the first microcavities 705 (and associated liquid crystal layers) may (gradually) increase from the center of a zone Z toward edges of the zone Z. In an embodiment, the height of the center first microcavity 705 (and associated center liquid crystal layer) positioned at the center of a zone Z is lowest, the height(s) of intermediary first microcavities 705 (and associated intermediary liquid crystal layers) positioned at two sides of the center first microcavity 705 may be larger than that of the center first microcavity 705, and the height(s) of the edge first microcavities 705 (and associated edge liquid crystal layers) positioned at edges of the zone Z may be highest. In the zone Z, a distance between the center portion of the second electrode 670 and the center first electrode 591 may be less than a distance between an edge portion of the second electrode 670 and an edge first electrode 591.

The first electrodes 591 may be applied with different voltages, such that the light passing through the liquid crystal molecules 710 in the first microcavities 705 may have different diffraction angles. The different heights of the first microcavities 705 may be optimized according to predetermined optimal diffraction angles. Advantageously, optimal display quality may be provided.

While this invention has been described in connection with what is presently considered to be practical embodiments, the invention is not limited to the disclosed embodiments. The invention is intended to cover various modifications and equivalent arrangements included within the spirit and scope of the appended claims.

<Description of Symbols>

| | |
|---|---|
| 11: second lower alignment layer | 12: first polarizer |
| 15: first adhesion member | 21: second upper alignment layer |
| 22: second polarizer | 31: first lower alignment layer |
| 41: first upper alignment layer | 100: display panel |
| 110: second substrate | 124: gate electrode |
| 133: storage electrode | 140: gate insulating layer |
| 150: semiconductor | 171: data line |
| 173: source electrode | 175: drain electrode |
| 180: passivation layer | 181: contact hole |
| 191: pixel electrode | 220: light blocking member |
| 230: color filter | 270: common electrode |
| 300: second sacrificial layer | 305: second microcavity |
| 307: second injection hole | |
| 310: liquid crystal molecule of a second liquid crystal layer | |
| 390: second encapsulation layer | 500: image control panel |
| 510: first substrate | 591: first electrode |
| 670: second electrode | 700: first sacrificial layer |
| 705: first microcavity | 707: first injection hole |
| 710: liquid crystal molecule of a first liquid crystal layer | |
| 790: first encapsulation layer | |

What is claimed is:

1. A display device comprising:
a display panel displaying an image; and
an image control panel controlling the image of the display panel,
wherein the image control panel includes:
a first substrate including a plurality of zones;
a plurality of first electrodes disposed at one of the plurality of zones of the first substrate;
a second electrode separated from the plurality of first electrodes by a plurality of first microcavities and disposed to enclose an upper surface and a side surface of the plurality of first microcavities;
a first roof layer disposed on the second electrode;
a first liquid crystal layer disposed in the plurality of first microcavities; and
a first encapsulation layer disposed on the first roof layer to seal the plurality of first microcavities, wherein
widths of the plurality of first electrodes decrease from a center of the one of the plurality of zones to an edge of the one of the plurality of zones, and
wherein widths of the plurality of first microcavities decrease from the center of the one of the plurality of zones to the edge of the one of the plurality of zones.

2. The display device of claim 1, wherein
the first electrode extends from one end of the first substrate toward the other end of the first substrate in one direction.

3. The display device of claim 2, wherein
the plurality of first electrodes are disposed parallel to one another and extend in an oblique direction with respect to edges of the first substrate.

4. The display device of claim 1, wherein
widths of the plurality of first electrodes decrease from the center of the one of the plurality of zones to both edges of the one of the plurality of zones.

5. The display device of claim 4, wherein
heights of the plurality of first microcavities associated with the plurality of first electrodes are uniform.

6. The display device of claim 4, wherein
the heights of the first microcavities are gradually increased closer to the edge of the zone from the center of the zone.

7. The display device of claim 3, wherein
the second electrode has a plate plane shape.

8. The display device of claim 3, further comprising:
a first lower alignment layer disposed on the plurality of first electrodes; and a first upper alignment layer disposed under the second electrode.

9. The display device of claim 8, wherein
the first lower alignment layer and the first upper alignment layer are vertically aligned and form a pre-tilted configuration.

10. The display device of claim 3, wherein
the display panel includes:
a second substrate;
a thin film transistor formed on the second substrate;
a pixel electrode connected to the thin film transistor;
a second roof layer separated from the pixel electrode via a plurality of second microcavities on the pixel electrode and formed to enclose an upper surface and a side surface of the second microcavity;
a second injection hole exposing a portion of the second microcavity;
a second liquid crystal layer filling the second microcavity; and
a second encapsulation layer formed on the second roof layer to cover the second injection hole thereby sealing the second microcavity.

11. The display device of claim 10, wherein
the second substrate includes a plurality of pixel areas disposed with a matrix shape, and
a plurality of pixel electrodes are formed in the plurality of pixel areas.

12. The display device of claim 11, further comprising
a common electrode formed under the second roof layer.

13. The display device of claim 12, further comprising:
a first lower alignment layer formed on the pixel electrode; and
a first upper alignment layer formed under the common electrode.

14. The display device of claim 2, wherein
at least one of the plurality of first electrodes and the second electrode is made of a material having the substantially same refractive index as that of the first liquid crystal layer.

15. The display device of claim 2, further comprising:
a first polarizer positioned outside the display panel;
a second polarizer positioned between the display panel and the image control panel; and
a third polarizer positioned outside the image control panel.

16. The display device of claim 15, further comprising:
a first adhesion member positioned between the display panel and the second polarizer; and
a second adhesion member positioned between the image control panel and the second polarizer.

17. The display device of claim 1, wherein
the image control panel includes a plurality of first electrodes, and
the plurality of first electrodes are formed with the substantially same width.

18. The display device of claim 17, wherein
odd-numbered first electrodes and even-numbered first electrodes among the plurality of first electrodes are applied with different signals.

* * * * *